US006415897B1

(12) United States Patent
Sugimoto et al.

(10) Patent No.: US 6,415,897 B1
(45) Date of Patent: Jul. 9, 2002

(54) BRAKE FLUID PRESSURE RETAINING UNIT

(75) Inventors: Yoichi Sugimoto; Shohei Matsuda; Shouji Suzuki; Takahiro Eguchi; Tetsuro Yamaguchi; Masaru Sasaguchi; Kazuaki Fukami, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,676

(22) Filed: Dec. 9, 1999

(30) Foreign Application Priority Data

Dec. 25, 1998 (JP) ............................. 10-370249

(51) Int. Cl.[7] ............................................. B60T 11/00
(52) U.S. Cl. ................................. 188/353; 303/119.1
(58) Field of Search ........................ 188/353, 151 R; 303/191, 901, 89, 119.1, 119.2, 192

(56) References Cited

U.S. PATENT DOCUMENTS

| 3,054,479 | A |   | 9/1962  | Allen |          |
|-----------|---|---|---------|-------|----------|
| 3,705,643 | A |   | 12/1972 | Iwaoka et al. |  |
| 3,767,271 | A | * | 10/1973 | Grosseau | 303/116.1 |
| 4,775,193 | A | * | 10/1988 | Farr et al. | 303/9.75 |
| 5,333,945 | A | * | 8/1994  | Volz et al. | 303/119.2 |
| 5,356,210 | A | * | 10/1994 | Maas | 303/116.1 |
| 6,030,056 | A | * | 2/2000  | Sawada et al. | 303/113.5 |
| 6,164,734 | A | * | 12/2000 | Otomo et al. | 303/122.1 |

FOREIGN PATENT DOCUMENTS

| GB | 2 314 596 A | 1/1998  |            |
|----|-------------|---------|------------|
| JP | 45-11251    | 4/1970  |            |
| JP | 61-179071   | 11/1986 | B60T/11/28 |
| JP | 62-90872    | 6/1987  |            |
| JP | 1-119438    | 5/1989  |            |
| JP | 10-081219   | 3/1998  |            |

OTHER PUBLICATIONS

Patent Abstracts of Japan 63043854, (Feb. 24, 1988) Akebono Brake Ind. Co., Ltd. *Abstract.
Patent Abstracts of Japan 60012360 A (Jan. 22, 1985) Isuzu Motors Ltd. *Abstract.

* cited by examiner

Primary Examiner—Pam Rodriguez
(74) Attorney, Agent, or Firm—Sughrue Mion, PLLC

(57) ABSTRACT

A brake fluid pressure retaining unit for retaining brake fluid pressure within a wheel cylinder after releasing a brake pedal is disclosed. The brake fluid pressure retaining unit includes a brake fluid pressure reduction speed control device for retaining reduction speed of the brake fluid pressure within the wheel cylinder less than that of brake pedal load applied by a driver. The brake fluid pressure reduction speed control device may be formed by a restriction in a brake fluid pressure circuit arranged between a master cylinder at which the brake fluid pressure is generated in accordance with a brake pedal load applied by the driver and the wheel.

3 Claims, 14 Drawing Sheets

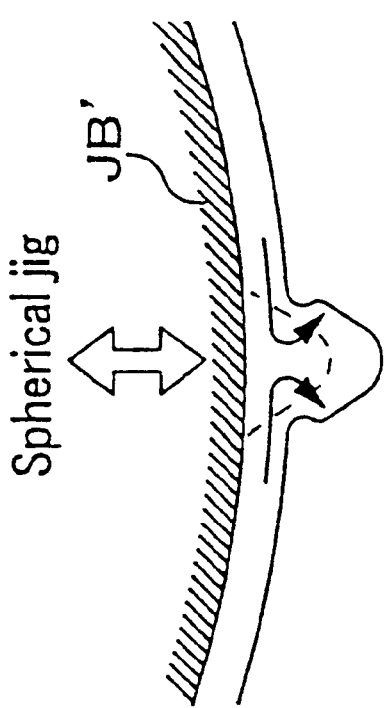
FIG. 4C2
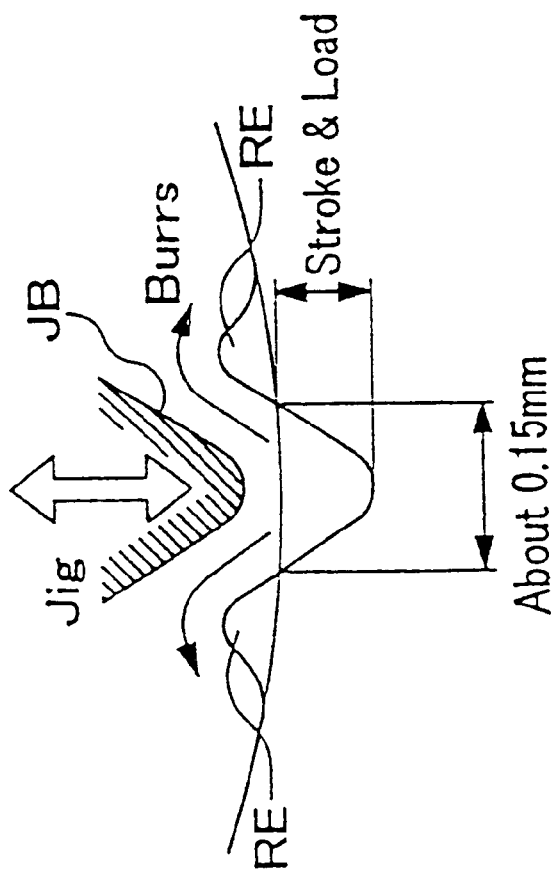
FIG. 4C1

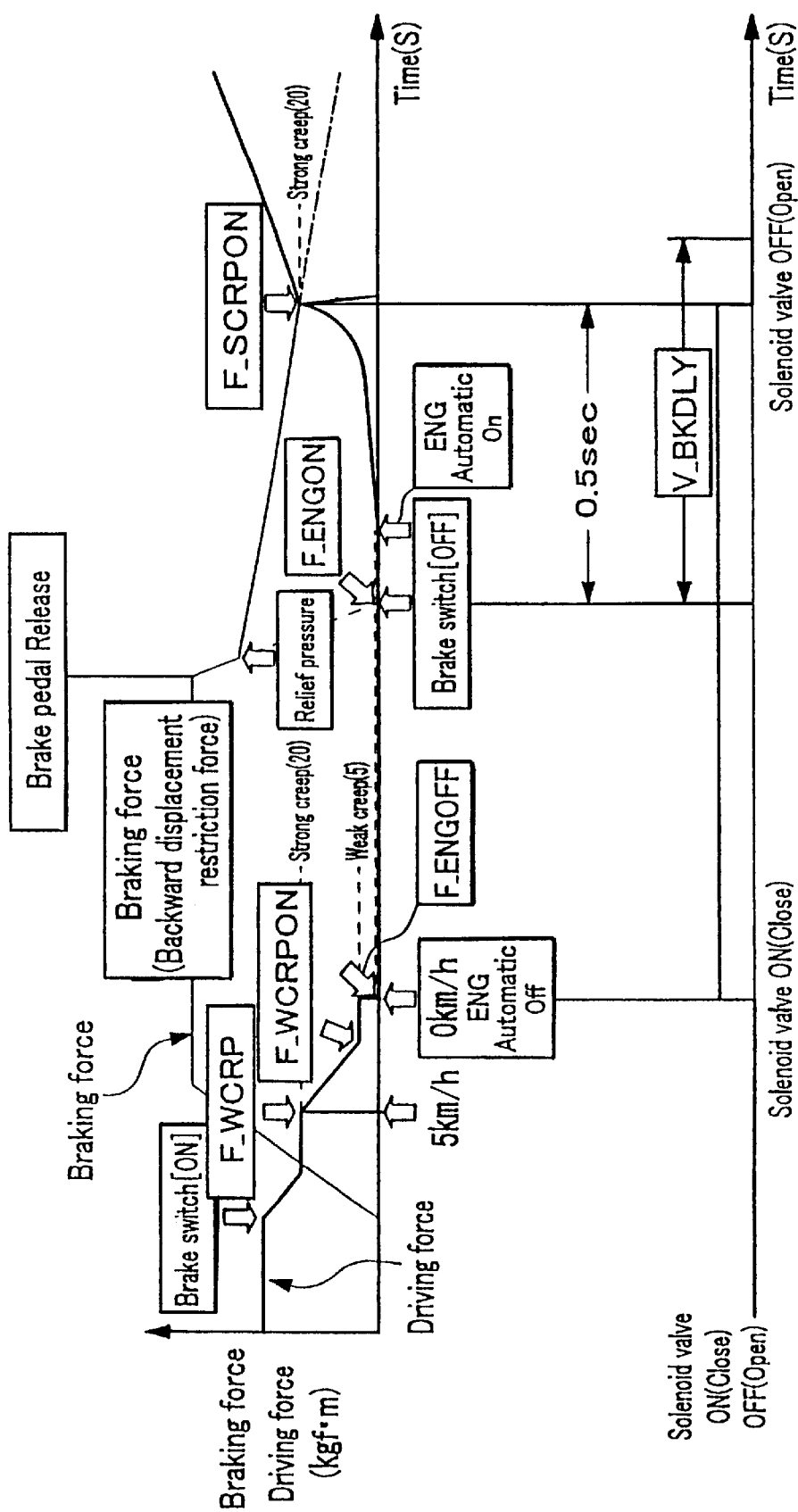

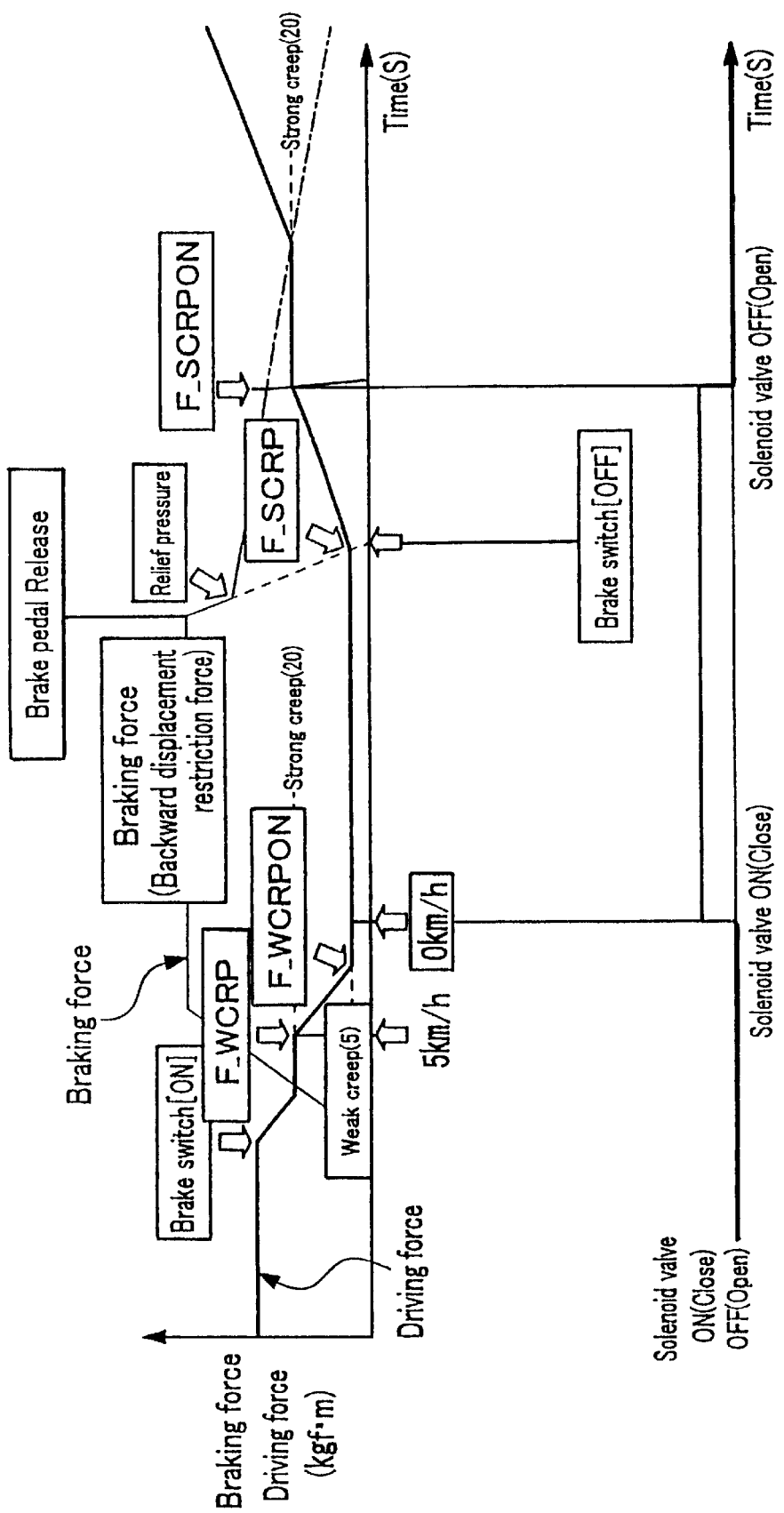

BRAKE FLUID PRESSURE RETAINING UNIT

FIELD OF THE INVENTION

The present invention relates to a brake fluid pressure retaining unit for retaining brake fluid pressure within a wheel cylinder after a driver releases a brake pedal.

BACKGROUND OF THE INVENTION

A brake fluid pressure retaining unit is disclosed in Japanese Laid-open Patent Publication No.60-12360. In this brake fluid pressure retaining unit when a brake pedal is released, brake fluid pressure is retained within a wheel cylinder until a starting operation is initiated and driving force is exerted on a vehicle such as by depressing an accelerator pedal in the case of an automatic transmission vehicle or by releasing a clutch pedal and depressing an accelerator pedal in the case of a manual transmission vehicle. This eliminates unintentional backward movement or displacement of the vehicle and hence facilitates the starting operation of the vehicle on a slope.

When starting off a motor vehicle on a down slope, the driver often releases the brake pedal instead of exerting driving force on the vehicle such that the vehicle starts to move due to its own weight. However if the vehicle is equipped with the above brake fluid pressure retaining unit, the vehicle could not start on the slope after releasing the brake pedal since the brake fluid pressure keeps on acting within the wheel cylinder until the starting operation is initiated. The brake fluid pressure retaining unit works irrespective of the inclination of the slope. In order to eliminate this drawback, Japanese Laid-open Patent Publication No. 63-43854 discloses a brake fluid pressure retaining unit, in which an inclination detecting means for detecting up slope or down slope and a switch which is turned on when the back gear of the transmission is selected are provided such that the brake fluid pressure retaining unit merely actuates when the vehicle climbs the slope in a forward or rearward direction.

SUMMARY OF THE INVENTION

The present invention seeks to provide a novel brake fluid pressure retaining unit, which can eliminate the aforementioned drawback without requiring the detection of up or down slope.

According to the present invention, there is provided a brake fluid pressure retaining unit for retaining brake fluid pressure within a wheel cylinder after releasing a brake pedal, the brake fluid pressure retaining unit comprising:

a brake fluid pressure reduction speed control means for retaining reduction speed of the brake fluid pressure within the wheel cylinder less than that of brake pedal load applied by a driver.

With such brake fluid pressure retaining unit when the brake pedal load applied by the driver is released, the brake fluid pressure within a wheel cylinder does not immediately decrease to zero as is in the normal run. The brake fluid pressure is retained within the wheel cylinder until the starting operation of the vehicle is initiated. In other words, the brake fluid pressure continues to act within the wheel cylinder during the time required for a pedal-changing action from the brake pedal to the accelerator pedal. This facilitates a smooth start of the vehicle on an up slope since the vehicle is prevented from unintentional backward displacement.

On a down slope, however, since the reduction speed of the brake fluid pressure within the wheel cylinder is slow, when releasing the brake pedal, the brake fluid pressure within the wheel cylinder gradually decreases to such an extent that the vehicle can start to move due to its own weight. Although it takes time, the brake fluid pressure in the end decreases to the amount corresponding to the brake pedal load applied by the driver after loosening the brake pedal BK. Therefore, the driver can start off the vehicle on the down slope merely by releasing or loosening the brake pedal BK and without operating the accelerator pedal.

According to the present invention, the brake fluid pressure reduction speed control means of the aforementioned brake fluid pressure retaining unit is formed by a restriction in a brake fluid pressure channel (brake fluid pressure circuit) arranged between a master cylinder at which the brake fluid pressure is generated in accordance with a brake pedal load applied by the driver and the wheel cylinder.

In such construction, when the brake pedal load is reduced, the brake fluid within the wheel cylinder returns to the master cylinder through the restriction in the brake fluid pressure channel between the master cylinder and the wheel cylinder. Since a flow of the brake fluid is restricted at the restriction, reduction speed of the brake fluid within the wheel cylinder will be less than that of the brake pedal load applied by the driver.

The present invention also seeks to provide a brake fluid pressure retaining unit for retaining brake fluid pressure within a wheel cylinder after releasing a brake pedal, wherein said brake fluid pressure retaining unit retains reduction speed of the brake fluid pressure within the wheel cylinder less than that of brake pedal load applied by a driver.

BRIEF DESCRIPTION OF THE DRAWINGS

FIGS. 4C1 and 4C2 respectively show a groove forming and coining in greater detail.

FIG. 7 shows the control of the brake fluid pressure retaining unit according to the present invention, in which

FIG. 8 shows the control of the brake fluid pressure retaining unit according to the present invention when the vehicle starts, in which

FIG. 9 is a time chart for the control of a vehicle including the brake fluid pressure retaining unit according to the present invention. Here, changes of driving force and braking force of the vehicle are shown together with opening and closing conditions of the solenoid valve. The driving force and the braking force are shown in time sequence order, i.e., braking, stopping and restarting the vehicle.

FIG. 13 is a time chart corresponding to FIG. 9, in which the engine is not automatically turned off when the vehicle stops.

DESCRIPTION OF THE PREFERRED EMBODIMENTS

A brake fluid pressure retaining unit according to the present invention may be applicable for all kinds of vehicles which have a braking device operable by hydraulic pressure (brake fluid pressure) and are provided with a motor. Here, the term "motor" includes an engine such as an internal combustion engine driven by gasoline and the like, Stirling engine as an external combustion engine, and an electric motor. Also, the term "vehicle" includes a manual transmission type vehicle and an automatic transmission type vehicle. Such brake fluid pressure retaining unit may be applicable to both types.

A brake fluid pressure retaining unit according to the present invention will be described in greater detail.

<Construction of Brake Fluid Pressure Retaining unit>

A brake fluid pressure retaining unit according to the invention is incorporated in a brake fluid pressure circuit of a hydraulically operable braking device. The brake fluid pressure retaining unit comprises a brake fluid pressure reduction speed control means for retaining reduction speed of brake fluid pressure within the wheel cylinder less than that of brake pedal load applied by a driver.

Figure 1:
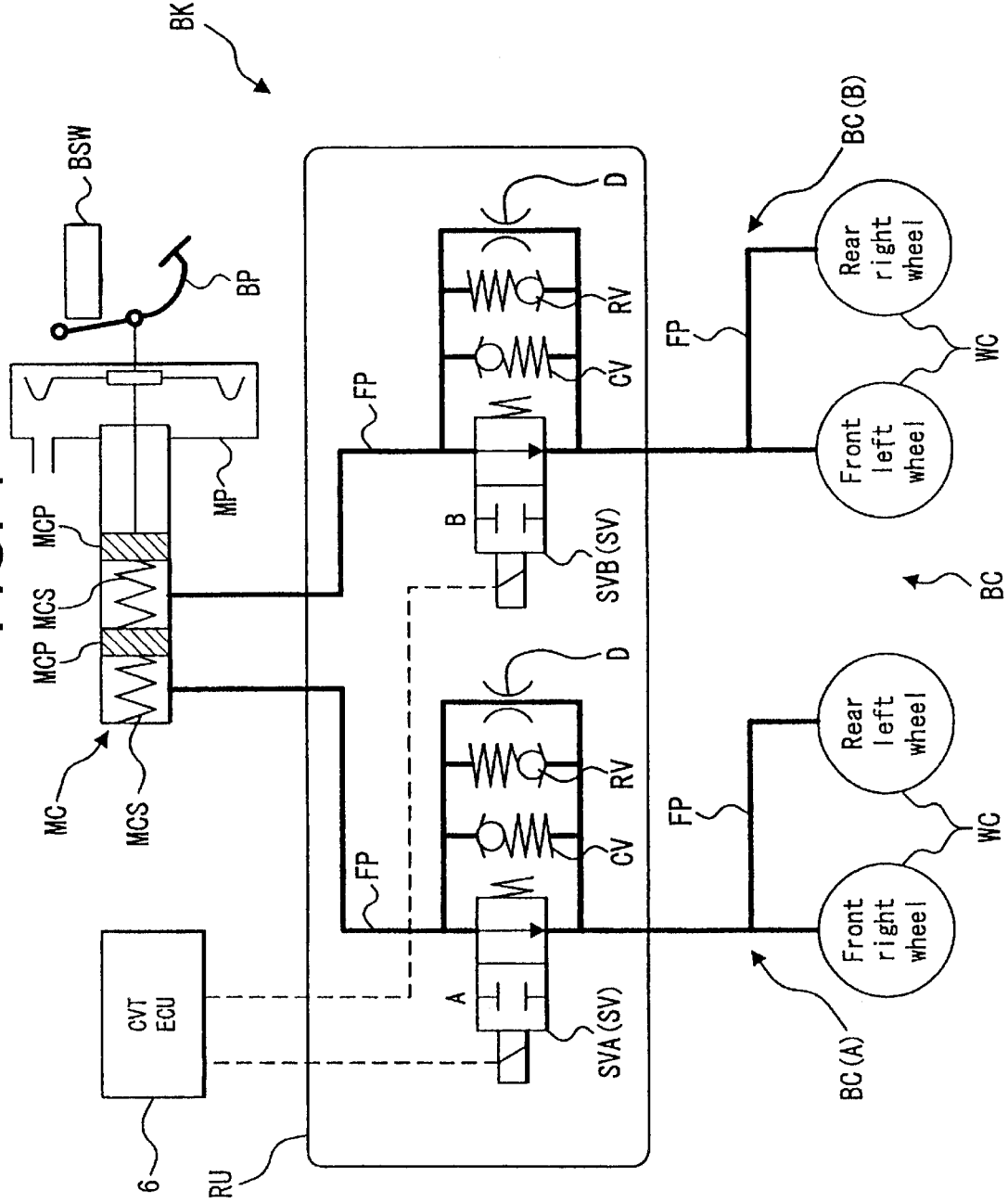
FIG. 1 shows a brake fluid pressure retaining unit according to the present invention arranged in a brake fluid pressure circuit of a hydraulically operable braking device.

With reference to FIG. 1, the brake fluid pressure retaining unit will be described in relation to a hydraulically operable braking device.

<Hydraulically Operable Braking Device>

A hydraulically operable braking device is shown in FIG. 1. A brake fluid pressure circuit BC of a hydraulically operable braking device BK comprises brake fluid piping FP connecting the braking device BK to a master cylinder MC and a wheel cylinder WC. Since brake is a very important factor for a safety run, the braking device BK has two separate systems of brake fluid pressure circuits BC(A), BC(B). Therefore, if one system is out of order, the remaining system works for obtaining a minimum braking force.

A master cylinder piston MCP is inserted into a main body of the master cylinder MC. When the driver applies a load to the brake pedal BP, the piston MCP is pressed and pressure is applied to the brake fluid within the master cylinder MC so that mechanical force is converted into brake fluid pressure, i.e., the pressure applied to the brake fluid. When the driver releases the brake pedal for removing the applied load, the piston MCP is returned to the original position by the resilient action of a return spring MCS and the brake fluid pressure is released. In view of fail-safe mechanism, there are provided two separate brake fluid pressure circuits BC. For this reason, the master cylinder MC shown in FIG. 1 is a tandem master cylinder, where two pistons MCP, MCP are connected in series so that a main body of the master cylinder MC is divided into two portions.

A master power MP (brake booster) is provided between the brake pedal BP and the master cylinder MC so as to ease the braking effort of the driver. The master power MP shown in FIG. 1 is a vacuum servo type. The master power MP takes out negative pressure from a manifold of a non-shown engine 1 so as to facilitate the braking operation of the driver.

The brake fluid piping FP connects the master cylinder MC and the wheel cylinder WC. The brake fluid piping FP functions as a fluid channel for the brake fluid. Brake fluid pressure generated at the master cylinder MC is transmitted to the wheel cylinder WC since a flow of the brake fluid travels through the brake fluid piping FP. When the brake fluid pressure within the wheel cylinder WC is greater, the brake fluid is transmitted from the wheel cylinder WC to the master cylinder MC through the brake fluid piping FP. Since separate brake fluid pressure circuits BC are provided for the reason mentioned above, there are also provided two separate brake fluid piping systems FP. The brake fluid pressure circuit BC such as constructed by the brake fluid piping shown in FIG. 1 is an X-piping type, where one brake fluid pressure circuit BC(A) is for braking a front right wheel and a rear left wheel, and the other brake fluid pressure circuit BC(B) is for braking a front left wheel and a rear right wheel. The brake fluid pressure circuit may be a front and rear dividing piping type, where one brake fluid pressure circuit is for braking front wheels, and the other brake fluid pressure circuit is for braking rear wheels.

The wheel cylinder WC is provided for each wheel so that the brake fluid pressure generated at the master cylinder MC and transmitted to the wheel cylinder WC through the brake fluid piping FP is converted into a mechanical force for braking wheels (braking force). A piston is inserted into the wheel cylinder WC so that when the piston is pressed by the brake fluid pressure, it generates a braking force for actuating brake pads in the case of disc brakes or brake shoes in the case of drum brakes.

Additionally, there may be provided hydraulic valves for controlling brake fluid pressure within the wheel cylinders of the front and rear wheels.

<Brake Fluid Pressure Retaining Unit>

With reference to FIG. 1, the brake fluid pressure retaining unit RU according to the present invention will be described. The brake fluid pressure retaining unit RU comprises a brake fluid pressure reduction speed control means for retaining reduction speed of the brake fluid pressure within the wheel cylinder less than that of brake pedal load applied by the driver upon starting the vehicle. The brake fluid pressure reduction speed control means works such that the reduction speed of the brake fluid pressure within the wheel cylinder (reduction speed of the braking force) becomes slower than that of the brake pedal load applied by the driver upon releasing the brake pedal BP.

The brake fluid pressure reduction speed control means having the above function is made by the provision of (I) a flow resistance against a flow of the brake fluid in the brake fluid pressure circuit or (II) means for restricting the movement of the brake pedal BP in addition to the brake fluid pressure circuit so as to restrict the recovering speed of the brake pedal BP from a brake pedal acting position to the original position in such a way that the brake pedal BP slowly returns to its original position if the driver quickly releases the brake pedal BP. The former is for restricting a flow of the brake fluid per se, while the latter is for restricting the movement of the brake pedal BP. In either case, reduction speed of the brake fluid pressure within the wheel cylinder will be less than that of brake pedal load applied by the driver.

(I) A variation will be described for the brake fluid pressure reduction speed control means, which is provided in the brake fluid pressure circuit BC of the hydraulically operable braking device. In this variation, there are provided a solenoid valve SV and a restriction D, and if necessary, a check valve CV and a relief valve RV for the restriction of a flow of the brake fluid per se. In this variation, the brake fluid pressure reduction speed control means comprises the solenoid valve SV and the restriction D.

The solenoid valve SV is open and closed by electric information from ECU 6. When the solenoid valve SV is closed, a flow of the brake fluid within the brake fluid piping FP is shut down so that brake fluid pressure within the wheel cylinder WC is retained. FIG. 1 shows two solenoid valves SV, SV which are open. Provision of the solenoid valve SV prevents the vehicle from unintentional backward displacement on a slope since the brake fluid pressure is retained within the wheel cylinder after the driver releases the brake pedal BP. The term "unintentional back ward displacement" means that the vehicle moves in an opposite direction due to its potential energy (own weight), in other words, the vehicle begins to descend backwardly on a slope.

The solenoid valve SV may be of both normally open and normally closed types. However, in view of fail-safe mechanism, a normally open type is preferable. This is because when electricity is cut off due to malfunction, brake does not work or brake always works in a normally closed type solenoid valve SV. In the normal operation, the solenoid valve SV is closed during the period from stopping to starting the vehicle. Conditions for closing or opening the solenoid valve SV (how the solenoid valve is closed or open) will be described later.

The restriction D always connects the master cylinder MC and the wheel cylinder WC notwithstanding that the solenoid valve SV is open or closed. Especially when the solenoid valve SV is closed and the driver gradually or at a time releases the brake pedal BP, the restriction D reduces the brake fluid pressure within the wheel cylinder WC at a certain speed by gradually transferring the brake fluid from the wheel cylinder WC to the master cylinder MC. Such a restriction D may be formed by the provision of a flow control valve or a flow resistance (constriction or reduced area portion where a part of the section is narrower) at the brake fluid piping FP.

With the provision of the restriction D when the driver gradually or at a time releases the brake pedal BP, braking force is gradually lowered so that even if the solenoid valve SV is closed, brake does not work permanently. In other words, reduction speed of the brake fluid pressure within the wheel cylinder WC will be slower than that of brake pedal load applied by the driver. Therefore, even if the solenoid valve SV is closed, braking force is reduced after a certain period of time so that the vehicle can be restarted on the up slope by the driving force of its motor. Meanwhile, the vehicle can be started on the down slope due to its potential energy without requiring the accelerator pedal operation of the driver.

The restriction D does not affect the braking force as long as the brake fluid pressure within the master cylinder MC due to the driver's brake pedal operation is greater than that within the wheel cylinder WC. This is because the brake fluid flows based on a pressure difference between the wheel cylinder WC and the master cylinder MC, i.e. from one at higher brake fluid pressure to the other at lower brake fluid pressure. Unless the driver releases the brake pedal BP, the brake fluid pressure within the wheel cylinder WC does not lower although it may increase. The restriction D may function as a check valve so as to prevent a counter flow from the master cylinder MC to the wheel cylinder WC.

Reduction speed of the brake fluid pressure within the wheel cylinder WC is determined so as to keep sufficient time for pedal-changing action of the driver from the brake pedal BP to the accelerator pedal that is the time for obtaining sufficient driving force of the motor to start the vehicle on the slope without unintentional backward displacement thereof. Normally, the time required for the pedal-changing action and for obtaining sufficient driving force of the motor is about 0.5 seconds.

In the case that the reduction speed of the brake fluid pressure within the wheel cylinder WC is faster, the vehicle will move backward on the slope before sufficient driving force of the motor will be obtained since braking force after releasing the brake pedal BP will be immediately lost even if the solenoid valve SV is closed. For this reason, this brake fluid pressure retaining unit can not achieve the purpose for facilitating the starting operation on the slope. On the contrary, in the case that the reduction speed of the brake fluid pressure within the wheel cylinder WC is slower, the vehicle will not move backward on the slope after releasing the brake pedal BP since the brake is working at all times. However, extra time and driving force is required for obtaining braking force and sufficient driving force to move the vehicle against the slope, leading to difficulty in the starting operation.

Reduction speed for reducing the brake fluid pressure within the wheel cylinder WC is determined by properties of the brake fluid or shape of the restriction D (cross section or length of the flow pass). The restriction D may be employed as an integral member with a solenoid valve SV and a check valve CV. In this case, the number of parts and install space may be reduced.

A check valve CV is provided in case of necessity. The check valve CV transfers the brake fluid pressure generated within the master cylinder MC into the wheel cylinder WC on condition that the solenoid valve SV is closed and the driver increases a pedal load. The check valve CV works effectively when the brake fluid pressure generated within the master cylinder MC is greater than the brake fluid pressure within the wheel cylinder WC, thereby quickly increasing the brake fluid pressure within the wheel cylinder WC in accordance with the increased brake pedal load.

If an arrangement is employed such that the closed solenoid valve SV is open when the brake fluid pressure within the master cylinder MC becomes greater than that within the wheel cylinder WC, there is no need to provide a check valve CV since the solenoid valve SV itself responds to the increased brake pedal load.

A relief valve RV is also provided in case of necessity. The relief valve RV transfers the brake fluid within the wheel cylinder WC into the master cylinder MC until the brake fluid pressure within the wheel cylinder becomes a certain pressure level on condition that the solenoid valve SV is closed and the driver gradually or at a time releases the brake pedal BP. The relief valve RV works when the brake fluid pressure within the wheel cylinder WC is greater than the predetermined brake fluid pressure and the brake fluid pressure within the master cylinder MC. Therefore, even if the solenoid valve SV is closed, extra brake fluid pressure within the wheel cylinder WC beyond the necessary brake fluid pressure is quickly reduced to a certain level of brake fluid pressure (relief pressure). Provision of the relief valve RV eliminates the drawback that reduction of the brake fluid pressure within the wheel cylinder WC through the restriction D requires too much time if the driver has forcefully depressed the brake pedal BP on the slope.

A brake switch BSW detects whether the brake pedal BP has been depressed or not, and then based on the detected value, it sends a signal to an ECU 6 (CVT ECU6) for opening and closing the solenoid valve SV. The brake switch BSW may be any means for detecting whether the driver s foot is put on the brake pedal BP. The brake switch BSW will be described later.

Figure 2:
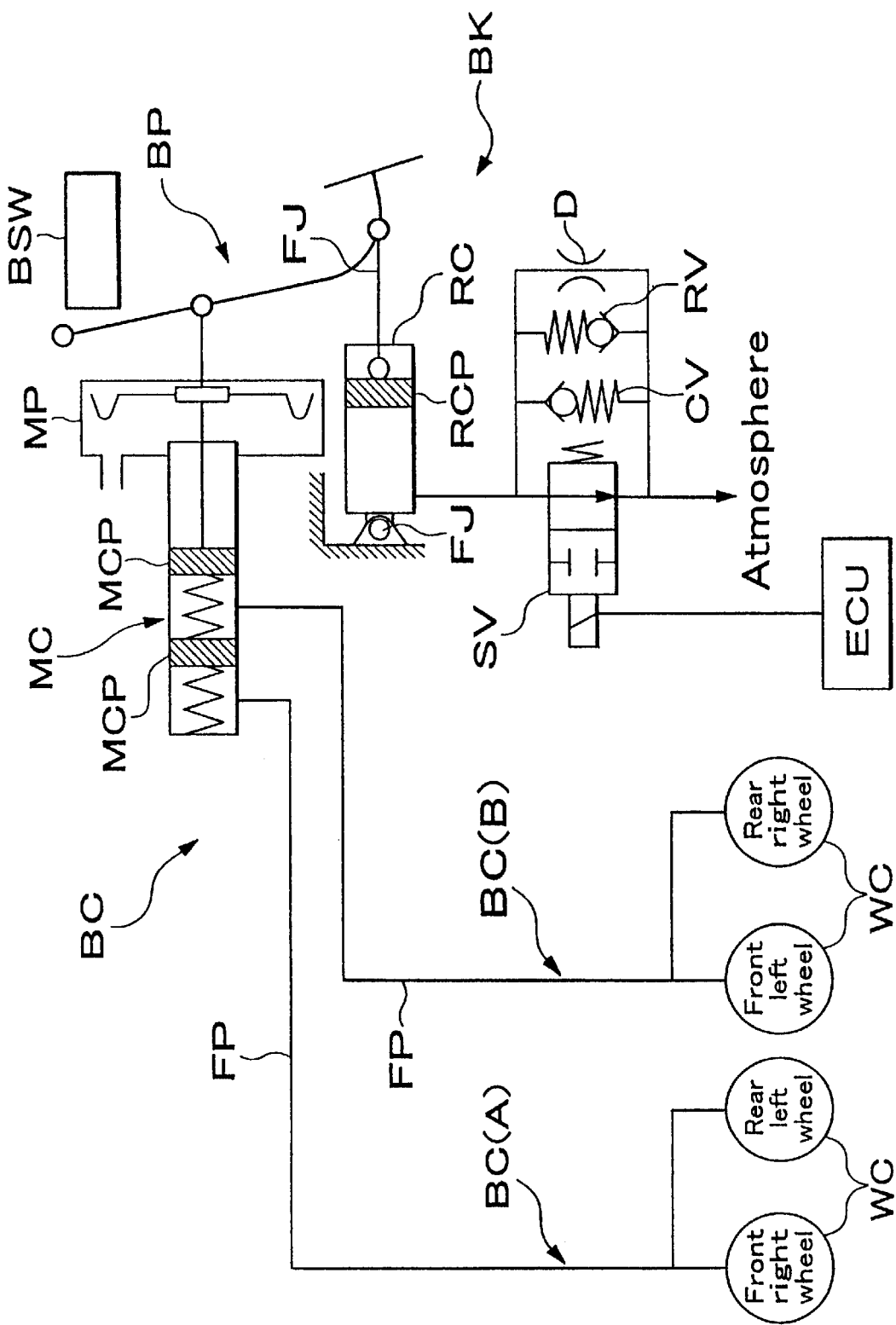
FIG. 2 shows a brake fluid pressure retaining unit according to the present invention arranged outside a brake fluid pressure circuit of a hydraulically operable braking device.

(II) A variation will be described for the brake fluid pressure reduction speed control means, which is provided outside the brake fluid pressure circuit BC of the hydraulically operable braking device BK. FIG. 2 shows a variation of the brake fluid pressure retaining unit of the present invention provided outside the brake fluid pressure circuit BC of the hydraulically operable braking device BK. In this variation, there is provided restricting means for restricting the recovering action of the brake pedal BP in order to restrict the recovering speed of the brake pedal BP. According to this variation, there is an advantage that only one solenoid valve SV is necessary in comparison to the arrangement that the brake fluid pressure reduction speed control means is provided in the brake fluid pressure circuit BC.

As shown in FIG. 2, the restricting means for restricting the recovering action of the brake pedal BP comprises a recovering action restricting cylinder RC, fixing jigs FJ for attaching the cylinder RC to the brake pedal BP and the vehicle body, a solenoid valve SV and a restriction D, and if necessary a check valve CV and a relief valve RV. The construction of the restricting means is substantially the same as the aforementioned arrangement where the brake fluid pressure reduction speed control means is provided in the brake fluid pressure circuit BC. The brake fluid pressure reduction speed control means is constructed for example from the recovering action restricting cylinder RC, solenoid valve SV and the restriction D.

A piston RCP is provided within the recovering action restricting cylinder RC. A main body of the cylinder RC is attached to the vehicle body and the piston RCP is attached to the brake pedal BP by way of the fixing jigs FJ. When the driver depresses the brake pedal BP, fluid such as air within the recovering action restricting cylinder RCP is discharged into the air. On the contrary, when the driver releases the brake pedal BP, fluid such as air flows into the recovering action restricting cylinder RC due to recovering action of the brake pedal BP. In order to restrict the recovering speed of the brake pedal BP, the solenoid valve SV and the like are connected to the recovering action restricting cylinder RC so that the amount of the fluid flown into the cylinder RC after releasing the brake pedal BP is restricted.

Operation and Function of the solenoid valve SV and the restriction D are common to the arrangement where the brake fluid pressure reduction speed control means is provided in the brake fluid pressure circuit BC of the hydraulically operable braking device BK.

The restricting means for restricting the recovering action of the brake pedal BP may be formed by restricting the pressure within the master power MP.

<Detailed Structure of the Brake Fluid Pressure Retaining Unit>

Figure 3:
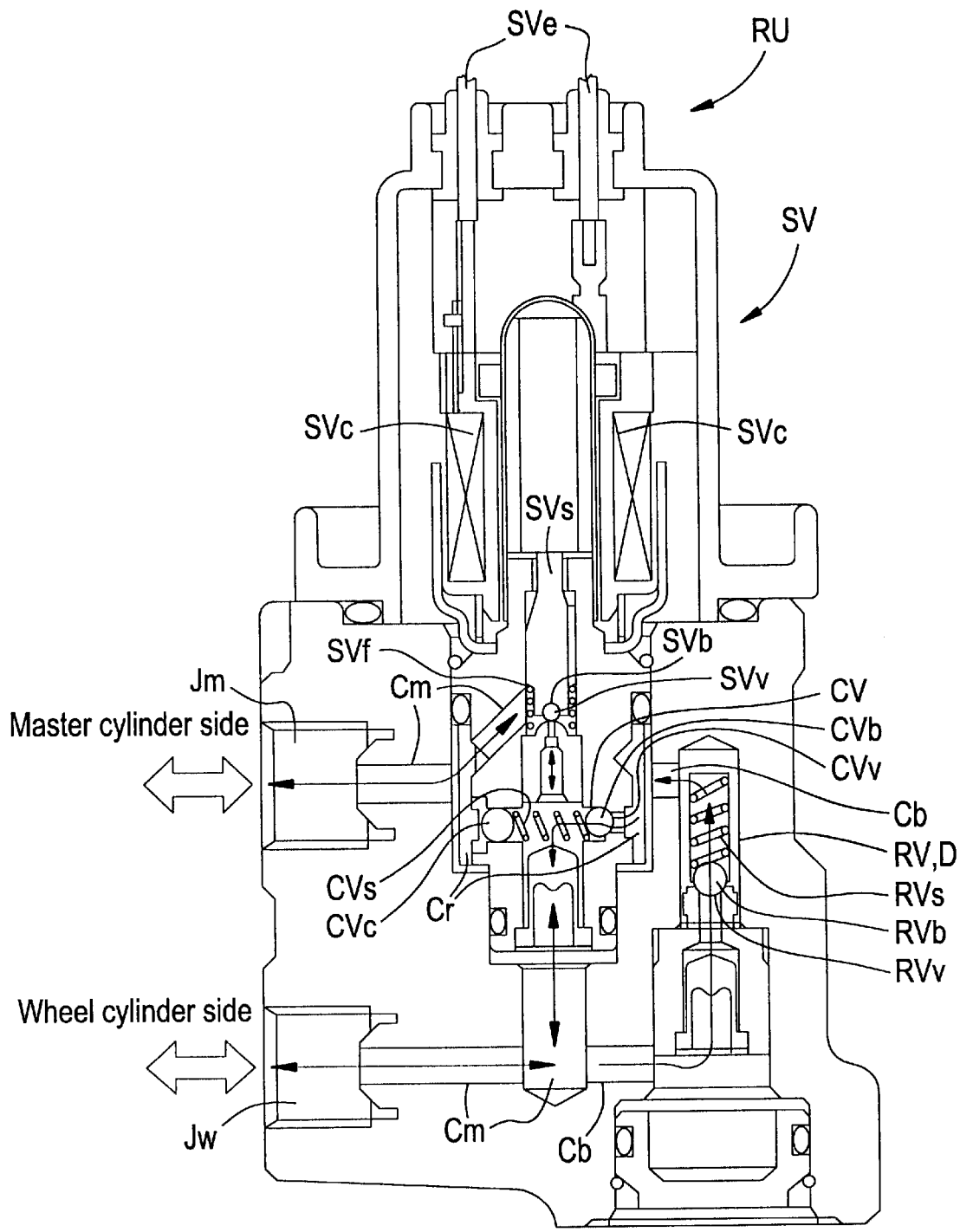
FIG. 3 is a sectional view showing detailed structure of the brake fluid pressure retaining unit according to the present invention.

With reference to FIG. 3, detailed structure of the brake fluid pressure retaining unit RU according to the present invention will be described. As shown in FIG. 3, the brake fluid pressure retaining unit RU comprises a solenoid valve SV, restriction D, check valve CV and a relief valve RV. If this brake fluid pressure retaining unit RU is provided within the brake fluid pressure circuit BC of the hydraulically operable braking device BK, the construction thereof will be the same as that disclosed in FIG. 1. In this brake fluid pressure retaining unit RU, the restriction D is integrally provided within the relief valve RV. Since the restriction D does not require install space, the brake fluid pressure retaining unit RU is compact. This is advantageous since it can be readily installed for a vehicle without a brake fluid pressure retaining unit RU. This brake fluid pressure retaining unit RU may be provided in the brake fluid pressure circuit BC shown in FIG. 1, or alternatively it may be provided outside the brake fluid pressure circuit BC such as shown in FIG. 2.

The solenoid valve SV positions upwardly of the brake fluid pressure retaining unit RU. When electric currents flow into a coil portion SVc of the solenoid valve SV, magnetic force is generated. A shaft SVs reciprocates under the influence of the magnetic force. Attached at the lower end of the shaft SVs is a ball SVb. The ball SVb is reciprocated by the reciprocating movement of the shaft SVs, thereby opening and closing a valve portion SVv. Electricity is supplied to the solenoid valve SV through two electrodes Sve, Sve. Reference numeral SVf indicates a spring for upwardly urging the shaft SVs.

When the solenoid valve SV is open, the brake fluid from the master cylinder MC flows from a joint Jm at a side of the master cylinder into the brake fluid pressure retaining unit RU, and then in turn flows through a main flow channel Cm (the main flow channel Cm, circular flow channel Cr and the main flow channel Cm), valve portion SVv which is open, main flow channel Cm and a joint Jw at a side of the wheel cylinder to the wheel cylinder WC. The brake fluid flows in the reverse when it flows from the wheel cylinder WC to the master cylinder MC.

When the main flow channel Cm is closed by the action of the solenoid valve SV, brake fluid pressure is retained within the wheel cylinder WC.

The check valve CV positions downwardly of the valve portion SVv of the solenoid valve SV. When the solenoid valve SV is closed and the driver increases the brake pedal load by further depressing the brake pedal BP, the brake fluid from the master cylinder MC flows from the joint Jm at the side of the master cylinder into the brake fluid pressure retaining unit RU, and then in turn flows through the main flow channel Cm, circular flow channel Cr, valve portion CVv of the check valve CV, main flow channel Cm and the joint Jw at the side of the wheel cylinder to the wheel cylinder WC. The check valve CV opens on condition that the brake fluid pressure within the master cylinder MC is greater than that within the wheel cylinder WC and the differential pressure between the master cylinder MC and the wheel cylinder WC is greater than the working pressure of the check valve CV. The working pressure of the check valve CV is determined for example by the spring force of the spring CVs for urging the ball CVb of the check valve CV. Here, reference numeral CVc indicates a ball for closing a communication hole in communication with the circular flow channel Cr. The circular flow channel Cr is a ring-shaped channel for brake fluid, which is provided at the lower end of the valve portion SVv so as to surround the check valve CV.

With the provision of the check valve CV even if the solenoid valve SV is closed, braking force can be increased by the driver s further brake pedal depressing operation.

The relief valve RV positions downwardly of the brake fluid pressure retaining unit RU. An upper portion of the relief valve RV is connected to the circular flow channel Cr though a branch channel Cb. When the solenoid valve SV is closed and the driver releases the brake pedal BP which has been forcefully depressed, the brake fluid within the wheel cylinder C flows into the master cylinder MC passing through the joint Jw at the side of the wheel cylinder WC, main flow channel Cm, branch channel Cb, valve portion RVv of the relief valve RV, branch channel Cb, circular flow channel Cr, main flow channel Cm and the joint Jm at the side of the master cylinder. The relief valve RV opens on condition that the brake fluid pressure within the wheel cylinder WC is greater than that within the master cylinder MC and the differential pressure between the wheel cylinder WC and the master cylinder MC is greater than the working pressure of the relief valve RV. The working pressure of the relief valve RV is determined for example by the spring force of the spring RVs for urging the ball RVb of the relief valve RV.

With the provision of the relief valve RV even if the solenoid valve SV is closed, the brake fluid pressure within the wheel cylinder WC is instantly decreased to the relief pressure by releasing the brake pedal BP.

The restriction D is provided as a small groove around the valve portion RVv of the relief valve RV (hereinafter described in greater detail). The groove is provided such that the ball does not block the groove when the relief valve RV is closed. Therefore, the master cylinder MC and the wheel cylinder WC are in constant communication through the restriction D irrespective of the open and closed condition of the solenoid valve SV, check valve CV and the relief valve RV. When the brake fluid pressure within the wheel cylinder WC is greater than that within the master cylinder MC, the brake fluid flows from the wheel cylinder WC into the master cylinder MC passing through the joint Jw at the side of the wheel cylinder, main flow channel Cm, branch channel Cb, restriction D provided at the valve portion RVv of the relief valve RV, branch channel Cb, circular flow channel Cr, main flow channel Cm and the joint Jm at the side of the master cylinder. Direction to which the brake fluid flows through the restriction is determined by the differential pressure between the master cylinder MC and the wheel cylinder WC. Amount of the brake fluid passing through the restriction in a certain period of time will change due to cross section of the flow channel of the restriction D, length of the flow channel, differential pressure between the master cylinder MC and the wheel cylinder WC, viscosity of the brake fluid and the like.

Since the restriction D is formed by a small groove, when the driver gradually or at a time releases the brake pedal BP, the brake fluid flows from the wheel cylinder WC to the master cylinder MC and therefore the braking force is gradually reducing.

Figure 4A:
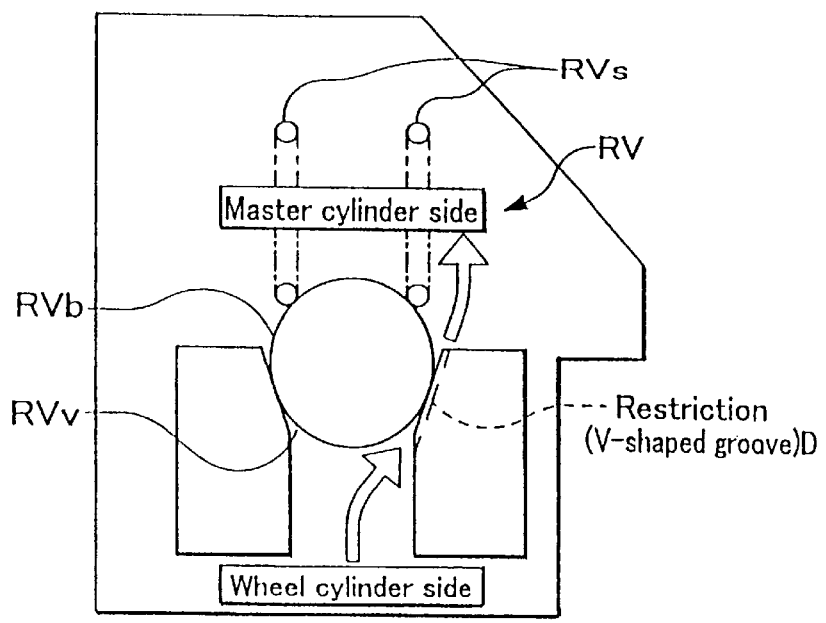
FIG. 4A shows an enlarged sectional view showing a main part of each relief valve and restriction.
Figure 4B:
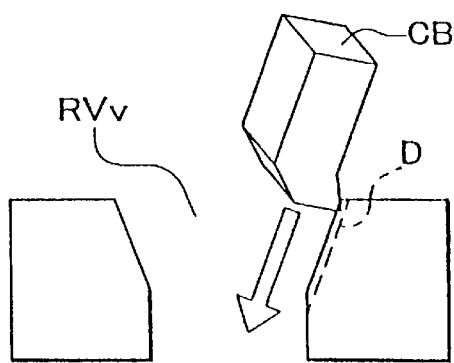
FIG. 4B explains a process for making a restriction by way of cutting.
Figure 4C:
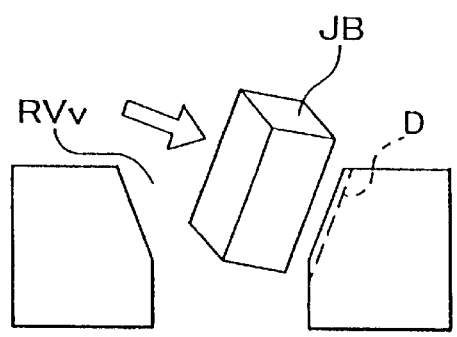
FIG. 4C explains a process for making a restriction by way of coining.

With reference to FIG. 4, the relief valve RV and the restriction D will be described in detail. FIG. 4A shows an enlarged sectional view showing a main part of each relief valve and restriction. FIG. 4B explains a process for making a restriction by way of cutting. FIG. 4C explains a process for making a restriction by way of coining. FIGS. 4C1 and 4C2 respectively show a groove forming and coining in greater detail.

The relief valve RV is of normally closed type in which the fluid channel for the brake fluid is blocked by the ball RVb. The ball RVb is pressed against the taper-shaped valve portion RVv by the spring RVs. In this arrangement, when the brake fluid within the wheel cylinder WC is greater than that within the master cylinder MC and the differential pressure between the wheel cylinder WC and the master cylinder MC is greater than the urging force of the spring RVs, the ball RVb floats against the spring RVs, thereby opening the relief valve RV. On the contrary, when the differential pressure is smaller than the urging force of the spring RVs, the floating ball RVs is pressed against the valve portion RVv, thereby closing the relief valve RV.

The restriction D is formed as a V-shaped groove having a smaller cross section. The V-shaped groove is formed at a part of the taper-shaped valve portion RVv in a direction along a flow of the brake fluid. As mentioned above, since the restriction D is not blocked by the ball RVb when the relief valve RV is closed, the restriction D enables constant communication of the brake fluid. The arrow shown in FIG. 4A indicates a flow of the brake fluid when the brake fluid pressure within the master cylinder MC is smaller. As long as the brake fluid is flown into the master cylinder MC at a certain speed after releasing the brake pedal BP, shape of the restriction D may be of any know shape such as a U-shaped groove or the like.

Since the restriction D is provided as a groove formed in the relief valve RV, the number of parts required and install space may be reduced. Further, manufacture of the restriction D will be less complicated for the reason hereinafter described.

As shown in FIG. 4B, the V-shaped restriction D is formed by way of cutting the taper-shaped valve portion RVv with a cutter blade CB. As shown in FIG. 4C, the restriction D may be formed by way of coining a jig against the taper-shaped valve portion RVv. The arrows shown in FIGS. 4B and 4C indicate directions to which the cutter blade CB and the jig JB are moved.

As shown in FIGS. 4C1 and 4C2, manufacture of the V-shaped groove may be carried out for example first by pressing a jig JB having a wedge-shaped front portion (groove making process) and then coining a spherical jig JB'. In this method, burrs resulting from the groove making process are leveled in the following coining process. This method is advantageous since the restriction D can be formed from material deformation and no chips are formed.

The restriction D shown in FIGS. 3 and 4 is integrally formed in the relief valve RV. However, the restriction D may be integrally formed in the solenoid valve SV or the check valve CV. The brake fluid pressure retaining unit RU shown in FIG. 3 is an integral structure combined with the solenoid valve SV and the like. However, when applying the restriction D as a V-shaped groove to the brake fluid pressure retaining unit RU, structure of the brake fluid pressure retaining unit RU is not limited to such an integral structure. In other words, when the restriction D is applied to the brake fluid pressure retaining unit RU where the solenoid valve SV and the check valve CV are separately connected, it may be formed as a V-shaped groove such as provided in the relief valve RV.

<Modification of the Brake Fluid Pressure Retaining Unit>

Figure 5:
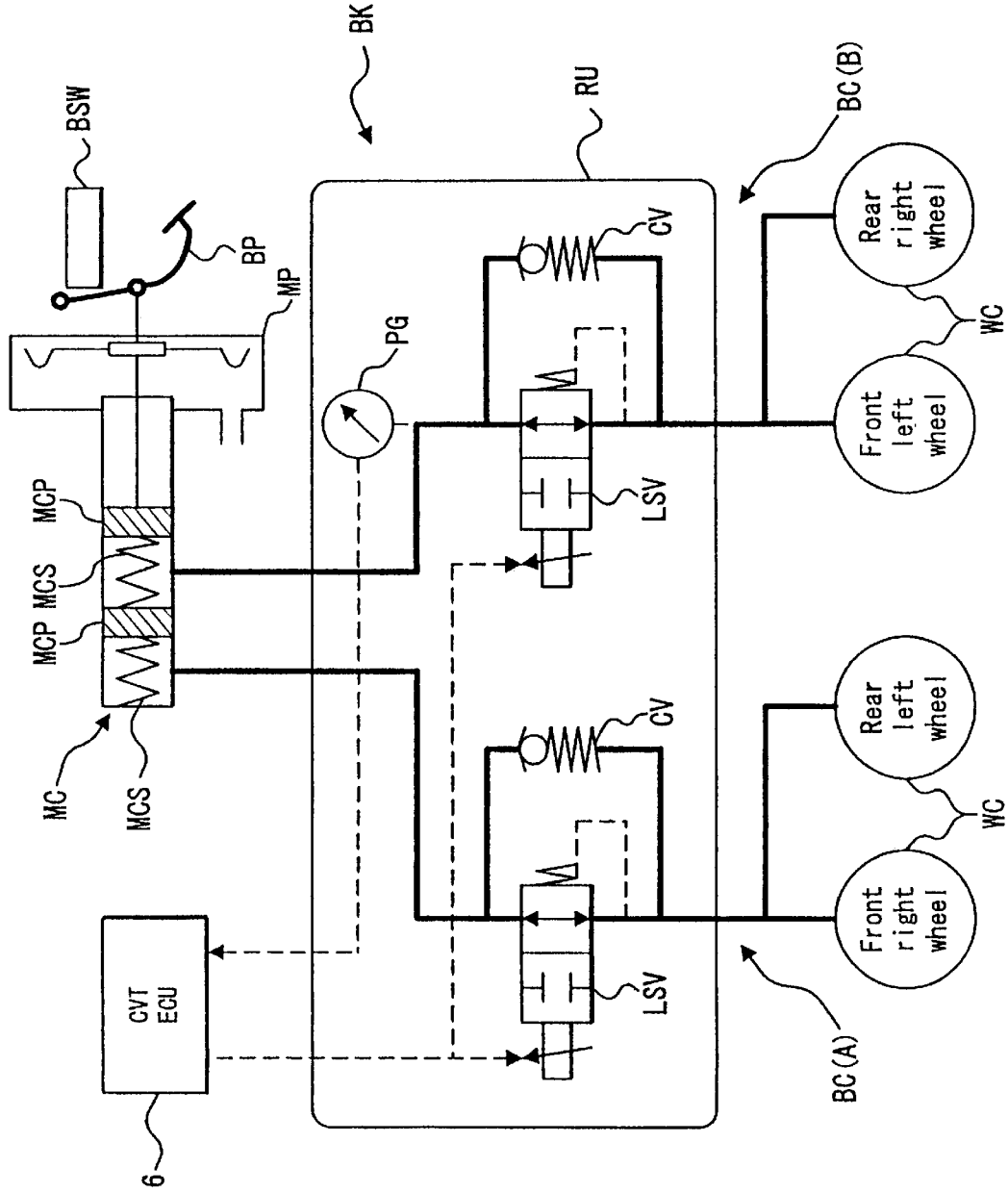
FIG. 5 shows a brake fluid pressure retaining unit according to the present invention, in which a servo valve is used.

Various modifications will be made for the brake fluid pressure retaining unit RU according to the present invention. For example, instead of employing the solenoid valve SV, restriction D and the relief valve RV, there may be used a servo valve LSV having the same functions as these elements (referring to FIG. 5). Reference numeral PG in FIG. 5 indicates a brake fluid pressure gauge for measuring the brake fluid pressure within the master cylinder MC and the servo valve LSV. The measured value is calculated at the ECU 6 (CVT ECU 6). The servo valve LSV then changes degrees of valve opening based on a command signal from the ECU 6, thereby adjusting the flow rate of the brake fluid (brake fluid pressure reduction speed). Here, the two servo valves LSV, LSV shown in FIG. 5 are open.

In this arrangement, since the servo valve LSV has functions as a restriction and a relief valve, reduced number of parts to be required and less install space can be achieved.

A check valve CV may be provided in case of necessity. If the arrangement is employed such that the servo valve LSV increases its degree of valve opening on condition that the brake fluid pressure within the master cylinder MC is greater than that within the wheel cylinder WC, the servo valve LSV itself can respond to the increased brake pedal load applied by the driver.

<Basic Operation of the Brake Fluid Pressure Retaining Unit>

With reference to FIG. 1, basic operation of the brake fluid pressure retaining unit according to the invention will be described.

Stop/Start Operations on Up Slope

For example, when the vehicle has to stop at a traffic light on an up slope, the driver depresses the brake pedal BP so as to prevent the vehicle from unintentional backward displacement due to its own weight. The brake fluid within the master cylinder MC is therefore pressed, and the brake fluid pressure within the master cylinder increases. This increased brake fluid pressure results in a flow of the brake fluid, which flows from the master cylinder MC to the wheel cylinder WC through the brake fluid piping FP and the solenoid valve Sv in the open condition. Therefore, the brake fluid pressure generated within the master cylinder MC is converted into the braking force for braking wheels, and the vehicle can be stopped.

The ECU (CVT ECU 6) judges conditions including the stop of the vehicle and closes the solenoid valve SV so as to retain the brake fluid pressure within the wheel cylinder WC. The ECU 6 is not required to judge whether the vehicle is stopped on a slope or not. In the case of the arrangement where a check valve CV is provided, even if the solenoid valve SV is closed, braking force is increased through the check valve CV when the driver further increases the brake pedal load.

In order to initiate the starting operation of the vehicle on the slope, the driver releases the brake pedal BP and in stead depresses the non-shown accelerator pedal. During the operation, since the solenoid valve SV is closed, the vehicle is prevented from unintentional backward displacement even if the driver releases the brake pedal BP. However, the brake fluid pressure within the wheel cylinder WC gradually decreases through the restriction D, and the braking force gradually decreases at the same time.

Meanwhile, when the driver depresses the accelerator pedal, the driving force of the vehicle increases. The vehicle can start off on the slope when the driving force of the vehicle becomes greater than the total amount of the prevention force, which prevents the vehicle from advancing the slope, and the braking force, which has been gradually reducing.

The provision of the restriction D ensures a smooth starting operation of the vehicle on the up slope unless the vehicle displaces backward for 0.5 seconds after the driver releases the brake pedal BP. Normally, sufficient driving force is obtained for the vehicle such as by depressing the accelerator pedal at 0.5 seconds after releasing the brake pedal BP. The provision of the relief valve RV ensures a smooth starting operation of the vehicle even if the driver has forcefully depressed the brake pedal BP than required. This is because the brake fluid pressure within the wheel cylinder WC immediately decreases to a certain brake fluid pressure level (relief pressure) after the driver gradually or at a time releases the brake pedal BP.

Brake dragging will be caused if the solenoid valve SV is continuously kept closed after the vehicle starts moving on the slope. For this reason, the solenoid valve SV is preferably controlled so as to be open when the driver initiates the starting operation. Specifically, the solenoid valve SV is controlled to be open when the accelerator pedal is depressed in the case of automatic transmission vehicles and when the accelerator pedal is depressed and the clutch is engaged by the return of the clutch pedal in the case of manual transmission vehicles. Further, in view of fail-safe performance, the solenoid valve SV may be controlled to be open at a certain period of time (for example 2 to 3 seconds) after releasing the brake pedal BP. Depression and release of the brake pedal BP is detected by the brake switch BSW. Alternatively, in order to prevent unintentional brake dragging, the solenoid valve SV may be controlled to be open when the vehicle reaches to a certain speed (for example 5 km/h).

Stop/Start Operations on Down Slope

When stopping the vehicle on a down slope, the driver depresses the brake pedal BP. The ECU 6 judges conditions including the stop of the vehicle and closes the solenoid valve SV so as to retain the brake fluid pressure within the wheel cylinder WC. As mentioned above, the ECU 6 does not judge whether the vehicle is stopped on a slope.

In order to start off the vehicle on the down slope, the driver then releases the brake pedal BP. Normally, in a down slope, the driver does not depress the accelerator pedal when starting the vehicle. The driver merely depresses the clutch pedal and disengages the clutch so that the vehicle can start moving due to its own weight. According to the brake fluid pressure retaining unit RU of the present invention, since the restriction is provided, braking force gradually decreases after releasing the brake pedal BP. The braking force decreases even if the solenoid valve SV is closed. Therefore, the driver can start the vehicle without operating the accelerator pedal.

In the brake fluid pressure retaining unit RU of the invention, the driver can start off the vehicle on an up slope without any difficulty. Further, the brake fluid pressure retaining unit RU does not affect a smooth start operation of the vehicle on a down slope and a flat place. Since the ECU 6 does not have to judge the slope, means for detecting slope (slope detecting means) is not necessary. Moreover, the brake fluid pressure retaining unit RU may be readily applicable to all kinds of vehicles.

<Other Modifications>

As to vehicles provided with a traction control system in which brake fluid pressure is generated irrespective of the brake pedal operation, a brake fluid pressure retaining unit according to the present invention may be formed such that control of the brake fluid pressure within the wheel cylinder upon releasing the brake pedal is carried out by the traction control system. However, in this arrangement, the traction control system has to control the brake fluid pressure within the wheel cylinder while detecting the reduction speed of the brake fluid pressure (reduction speed of the brake pedal load) such as in the case of the brake fluid retaining unit RU having the servo valve LSV shown in FIG. 5.

As to vehicles provided with an antilock braking system which controls the brake fluid pressure within the wheel cylinder upon depressing the brake pedal, a brake fluid pressure retaining unit according to the present invention may be formed such that control of the brake fluid pressure within the wheel cylinder is carried out by the antilock braking system.

EXAMPLE

The present invention will be described in greater detail by way of specific examples.

Figure 6:
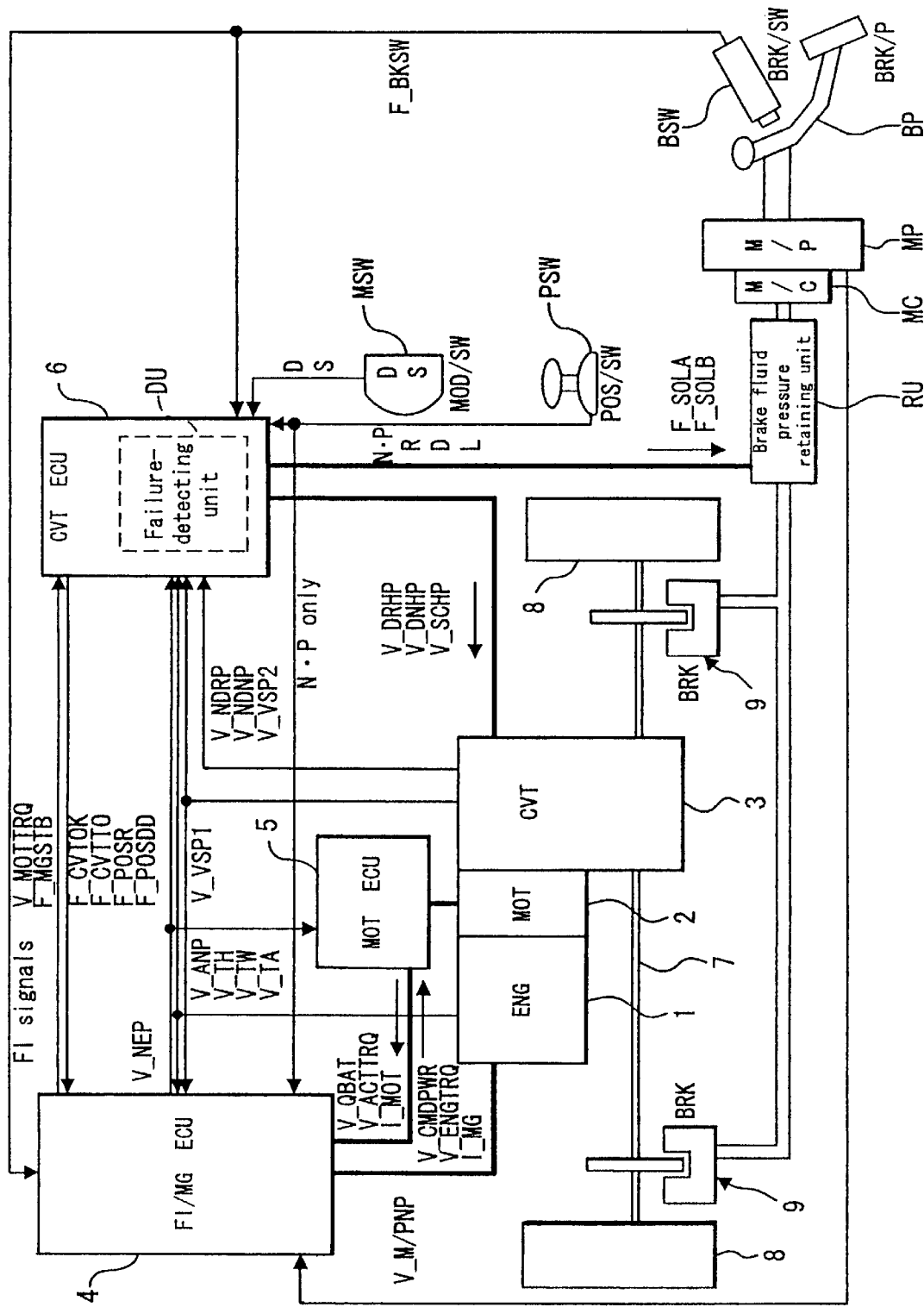
FIG. 6 shows a system configuration of a vehicle including the brake fluid pressure retaining unit according to the present invention.

In this example, a brake fluid pressure retaining unit according to the present invention is applied to an automatic transmission vehicle (hereinafter referred to as a vehicle). The system configuration of this vehicle is shown in FIG. 6.

The vehicle shown in this example is a hybrid vehicle having an engine and an electric motor as a driving motor, and is provided with a belt-type continuously variable transmission (hereinafter referred to as CVT) as a transmission. The brake fluid pressure retaining unit RU applied to the vehicle includes a solenoid valve SV, restriction D, relief valve RV and a check valve CV in the brake fluid pressure circuit BC. This brake fluid pressure retaining unit RU is the same as that shown in FIG. 1.

The vehicle is further provided with a driving force reduction apparatus or/and a driving motor stopping apparatus. The driving force reduction apparatus is for reducing creep driving force on condition that the driving motor is idling, the vehicle moves under a certain speed, and the brake pedal BP is depressed. The driving motor stopping apparatus is for automatically stopping the driving motor while the vehicle stops. Moreover, the vehicle is provided with a system for automatically initiating automatic control for generating driving force on condition that the brake pedal BP is released and the brake switch BSW is off.

<System Configuration>

The system configuration of the vehicle will be described with reference to FIG. 6. The vehicle is provided with an engine 1 and a motor 2 as a driving motor, and a belt-type continuously variable transmission (CVT 3) as a transmission. The engine 1 is controlled at a fuel injection electronic control unit (hereinafter referred to as FI ECU). The FI ECU is integrally constructed with a management electronic control unit (hereinafter referred to as MG ECU), and it is equipped in a fuel injection/ management electronic control unit 4 (hereinafter referred to as FI/MG ECU). The motor 2 is controlled at a motor electronic control unit 5 (hereinafter referred to as MOT ECU). Further, the CVT 3 is controlled at a CVT electronic control unit 6 (hereinafter referred to as CVT ECU).

A drive axle 7 provided with driving wheels 8, 8 is mounted to the CVT 3. Each driving wheel 8, 8 is provided with a disc brake 9, which includes the wheel cylinder WC and the like (FIG. 1). The wheel cylinders WC of the disc brakes 9,9 are connected to the master cylinder MC through the brake fluid pressure retaining unit RU. When the driver depresses the brake pedal BP, the brake pedal load generated is transmitted to the master cylinder MC through the master power MP. The brake switch BSW detects whether the brake pedal BP is depressed or not. As mentioned above, instead of detecting the depression of the brake pedal BP, the brake switch BSW may detect whether the driver's foot is put on the brake pedal BP.

The engine 1 is an internal combustion engine, which makes use of thermal energy. The engine 1 drives the driving wheels 8, 8 through the CVT 3 and the drive axle 7. In order to improve fuel economy, the engine 1 may be automatically turned off when the vehicle stops. For this reason, the vehicle is provided with a driving motor stopping apparatus for automatically turning off the engine 1 when certain automatic engine stop conditions are satisfied.

The motor 2 has an assist mode for the assist of the engine drive with the use of electric energy from a non-shown battery. The motor 2 has a regeneration mode for converting the kinetic energy derived from the rotation of the drive axle 7 into electric energy. When the engine does not require the assist from the assist mode (such as for starting on a down slope or deceleration of the vehicle), the thus converted electric energy is stored in a non-shown battery. Further, the motor 2 has an actuation mode for actuating the engine 1.

The CVT 3 includes an endless belt winded between a drive pulley and a driven pulley so as to enable continuously variable gear ratio by changing a winding radius of the endless belt. Change of the winding radius is achieved by changing each pulley width. The CVT 3 engages the clutch and an output shaft so as to transmit the output of the engine 1 converted by the endless belt into the drive axle 7 through gears at the output side of the clutch. The vehicle equipped with the CVT 3 enables creep running, and such a vehicle requires a driving force reduction apparatus for reducing the driving force to be utilized for the creep running. Driving force of the creep running is adjustable by the engaging force of the clutch. The driving force of the creep running is adjusted for two conditions, i.e., strong driving force and weak driving force. The strong driving force is equivalent to a driving force to keep the vehicle stationary on the slope at an inclination angle of 5 degrees. This is called "strong creep" in this example. In the weak driving force, almost no driving force is obtained. This is called "weak creep" in this example. In the strong creep, when the accelerator pedal is released (i.e., the vehicle is in the idling condition) and a positioning switch is selecting a running range (D range, L range or R range), the vehicle moves slowly after releasing the brake pedal BP as if the vehicle creeps on the ground. In the weak creep, however, when the vehicle moves under a certain low speed and the brake pedal BP is depressed, the vehicle stops or moves at a very low speed.

Range positions of the positioning switch PSW is selected by a shift lever. Such range positions are selected from P range to be used for parking the vehicle, N range as a neutral range, D range to be used for a normal run, and L range to be used for obtaining a sudden acceleration or strong engine brake. The term "running range" indicates a range position, where the vehicle can move. In this vehicle, the running range includes D range, L range and R range. Further, when the positioning switch PSW selects the D range, D mode as a normal running mode and S mode as a sports mode can be selected by a mode switch MSW.

The FI ECU contained in the FI/MG ECU 4 controls the amount of fuel injection so as to achieve the optimum air fuel ratio, and it also generally controls the engine 1. Various kinds of Information such as a throttle angle and conditions of the engine 1 are transmitted to the FI ECU such that the engine 1 is controlled based on such information. The MG ECU contained in the FI/MG ECU 4 mainly controls the MOT ECU 5 as well as judges the automatic engine stop condition and the automatic engine actuation condition. The MG ECU receives information as to conditions of the motor 2 and other information such as conditions of the engine 1 from the FI ECU, and based on such information it sends instructions about the mode switching of the motor 2 to the MOT ECU 5. Further, the MG ECU receives information such as conditions of the CVT 3, conditions of the engine 1, range information of the positioning switch PSW, conditions of the motor 2 and the like, and based on such information it judges whether the engine 1 should be automatically stopped or automatically actuated.

The MOT ECU 5 controls the motor 2 based on a control signal from the FI/MG ECU 4. The control signal from the FI/MG ECU 4 includes mode information instructing actuation of the engine 1 by the motor 2, assistance of the engine actuation or regeneration of electric energy, and an output required value to the motor 2, and the MOT ECU 5 sends an order to the motor 2 based on such information. Further, the MOT ECU 5 receives information from the motor 2 and transmits information such as the amount of generated energy or the capacity of the battery to the FI/MG ECU 4.

The CVT ECU 6 controls the transmission gear ratio of the CVT 3, the engagement force of the clutch and the like. Various kinds of information such as conditions of the CVT 3, conditions of the engine 1, range information of the positioning switch PSW and the like are transmitted to the CVT ECU 6, and based on such information the CVT ECU 6 transmits a signal to the CVT 3, the signal of which includes the control of hydraulic pressure of each cylinder provided at the drive pulley and the driven pulley of the CVT 3, and the control of hydraulic pressure of the clutch. The CVT ECU 6 further controls the On/Off (open and close) operation of the solenoid valves SVA, SVB in the brake fluid pressure retaining unit RU (FIG. 1) as well as carries out the judgment as to whether the creep driving force should correspond to the strong creep or the weak creep. The CVT ECU 6 is equipped with a failure-detecting unit DU for the purpose of detecting malfunction of the brake fluid pressure retaining unit RU. The failure-detecting unit DU is provided with a driving circuit for the On/Off (open and close) operation of the solenoid valves SVA, SVB in the brake fluid pressure retaining unit RU.

The disk brakes 9, 9 are constructed such that a disk rotor rotatable with the driving wheel 8 is pressed between the brake pads moved by the wheel cylinder WC (FIG. 1) and the braking force is obtained by the frictional force therebetween. The brake fluid pressure within the master cylinder MC is transmitted to the wheel cylinder WC through the brake fluid pressure retaining unit RU.

With the provision of the brake fluid pressure retaining unit RU the brake fluid pressure within the wheel cylinder WC keeps on acting after releasing the brake pedal BP. The brake fluid pressure retaining unit RU comprises a driving circuit for the failure-detecting unit DU within the CVT ECU 6 so as to open and close the solenoid valves SVA, SVB in the brake fluid pressure retaining unit RU.

The On/Off operation of the solenoid valve is meant as follows. In the normally open type solenoid valve, when the solenoid valve is turned on (On), the valve is closed, and when the solenoid valve is turned off (Off), the valve is open. In the normally closed type solenoid valve, when the solenoid valve is turned on (On), the valve is open, and when the solenoid valve is turned off (Off), the solenoid valve is closed. The solenoid valves SVA, SVB in this example are of normally open type. The driving circuit supplies a coil of the solenoid valve SVA, SVB with electric currents so as to turn on the solenoid valves SVA, SVB, and stops the supply of electric currents so as to turn off the solenoid valves.

The master cylinder MC, master power MP, brake switch BSW and the like are the same as those previously described.

The driving force reduction apparatus equipped in the vehicle comprises the CVT 3 and the CVT ECU 6. When the brake pedal BP is depressed and the vehicle moves under 5 km/h (under a certain low speed), the driving force reduction apparatus reduces the creep driving force from the strong creep to the weak creep. The driving force reduction apparatus judges whether the brake pedal BP is depressed. This is carried out at the CVT ECU 6 based on a signal from the brake switch BSW. The driving force reduction apparatus also judges from vehicle speed pulse whether the vehicle moves under 5 km/h. When the driving force reduction apparatus judges the conditions that the brake pedal BP is depressed and the vehicle moves under 5 km/h, the CVT ECU 6 sends an order to the CVT 3 for reducing the engaging force of the clutch, thereby reducing the creep driving force. In addition to the above two basic conditions, the CVT ECU 6 further judges other conditions in that the brake fluid temperature is over a certain value, that the brake fluid pressure retaining unit RU is normal (including the condition that the driving circuit of the solenoid valves SVA, SVB (FIG. 1) in the brake fluid pressure retaining unit RU is normal), and that the positioning switch PSW is in the D range. When the CVT ECU 6 judges all the above five conditions, the driving force is decreased. Since the driving force reduction apparatus reduces the driving force, deteriorated fuel consumption of the vehicle is prevented. When the vehicle stops and is in weak creep, the CVT ECU 6 judges the conditions for the strong creep. When the conditions for the strong creep are satisfied, the CVT ECU 6 sends an order to the CVT 3 for increasing the engaging force of the clutch, thereby increasing the creep driving force. Further, when the failure-detecting unit DU detects malfunction of the brake fluid pressure retaining unit RU, the operation of the driving force reduction apparatus is prohibited.

The driving motor stopping apparatus equipped in the vehicle comprises the FI/MG ECU 4. The driving motor stopping apparatus automatically turns off the engine 1 when the vehicle stops. At the MG ECU of the FI/MG ECU 4 the driving motor stopping apparatus judges the conditions for automatically turning off the engine such as the vehicle speed of 0 km/h. The automatic stop conditions of the engine will be described later. When all of the automatic stop conditions of the engine are satisfied, the FI/MG ECU 4 sends an engine stop order to the engine 1 so as to automatically turn off the engine 1. Since the driving motor stopping apparatus automatically turns off the engine, deteriorated fuel consumption of the vehicle is prevented.

The MG ECU of the FI/MG ECU 4 judges the automatic actuation conditions of the engine while the driving motor stopping apparatus automatically turns off the engine 1. When all of the automatic actuation conditions of the engine are satisfied, the FI/MG ECU 4 sends an engine actuation order to the MOT ECU 5. The MOT ECU 5 further transmits an engine actuation order to the motor 2. The motor 2 then automatically actuates the engine 1, and at the same time the vehicle becomes in strong creep. The automatic actuation conditions of the engine will be described later. Further, when the failure-detecting unit DU detects malfunction of the brake fluid pressure retaining unit RU, the operation of the driving motor stopping apparatus is prohibited.

Signals to be transmitted and received in this system will be described. With reference to FIG. 6, the letter "F_" in front of each signal indicates that the signal is flag information, which is either 0 or 1. The letter "V_" indicates that the signal is numerical information (unit is optional), and the letter "I_" indicates that the signal includes plural kinds of information.

A signal transmitted from the FI/MG ECU 4 to the CVT ECU 6 will be described. V_MOTTRQ represents output torque value. F_MGSTB is a flag showing whether all of the engine stop conditions (hereinafter described) except for the five conditions of F_CVTOK are satisfied. If all the conditions are satisfied, the numeral 1 is given, and if not, the numeral 0 is given. When the F_MGSTB and the F_CVTOK are both turned to 1, the engine 1 is automatically turned off. When one of these flags is turned to 0, the engine 1 is automatically turned on.

A signal transmitted from the FI/MG ECU 4 to the CVT ECU 6 and the MOT ECU 5 will be described. V_NEP represents engine speed.

A signal transmitted from the CVT ECU 6 to the FI/MG ECU 4 will be described. F_CVTOK is a flag showing whether five conditions are satisfied, the conditions of which includes (1) the CVT 3 is in weak creep, (2) ratio of the CVT 3 (pulley ratio) is low, (3) oil temperature of the CVT 3 is over a certain value, (4) temperature of the brake fluid is over a certain value, and (5) the brake fluid pressure retaining unit RU is normal (including the condition that the driving circuit of the solenoid valves SVA, SVB (FIG. 1) in the brake fluid pressure retaining unit RU is normal). When all of the five conditions are satisfied, the numeral 1 is given, and if not, the numeral 0 is given. While the engine 1 is turned off, the above conditions (1) to (4) are maintained and the F_CVTOK is judged merely from the condition (5) that is whether the brake fluid pressure retaining unit RU is normal. When the engine 1 is turned off and the brake fluid pressure retaining unit RU is normal, the F_CVTOK is 1. When the brake fluid pressure retaining unit RU is out of order, the F_CVTOK is 0.

F_CVTTO is a flag showing a condition whether oil temperature of the CVT 3 is over a certain value. If the oil temperature is at the certain value or more, the numeral 1 is given, and if the oil temperature is below the value, the numeral 0 is given. Oil temperature of the CVT 3 is obtained from electrical resistance value of the linear solenoid controlling the hydraulic pressure of the clutch in the CVT 3. F_POSR is a flag showing a condition whether the positioning switch PSW is selected in the R range. If the positioning switch PSW selects the R range, the numeral 1 is given, and if not, the numeral 0 is given. F_POSDD is a flag showing a condition whether the positioning switch PSW selects the D range and the mode switch MSW selects the D mode. If the D range and the D mode (D range/D mode) are selected, the numeral 1 is given, and if not, the numeral 0 is given. When the FI/MG ECU 4 does not receive any information indicating the D range/D mode, R range, P range or the N range, the FI/MG ECU 4 judges either the D range/S mode or the L range is selected.

A signal transmitted from the engine 1 to the FI/MG ECU 4 and the CVT ECU 6 will be described. V_ANP represents negative pressure value at the intake pipe of the engine 1. V_TH represents throttle angle. V_TW represents temperature of the cooling water at the engine 1. V_TA represents intake temperature of the engine 1. Temperature of the brake fluid within the brake fluid pressure retaining unit RU, which is disposed within the engine compartment is obtained from the intake temperature. This is because both temperatures change with respect to the temperature at the engine compartment.

A signal transmitted from the CVT 3 to the FI/MG ECU 4 and the CVT ECU 6 will be described. V_VSP1 represents vehicle speed pulse from one of the two vehicle speed pickups provided in the CVT 3. Vehicle speed is calculated based on the vehicle speed pulse.

A signal transmitted from the CVT 3 to the CVT ECU 6 will be described. V_NDRP represents pulse showing the number of revolutions of the drive pulley provided at the CVT 3. V_NDNP represents pulse showing the number of revolutions of the driven pulley provided at the CVT 3. V_VSP2 represents vehicle speed pulse from the other vehicle speed pickup at the CVT 3. The V_VSP2 is more accurate than the V_VSP1, and the V_VSP2 is used for calculating the amount of clutch slipping at the CVT 3.

A signal transmitted from the MOT ECU 5 to the FI/MG ECU 4 will be described. V_QBAT represents remaining capacity of the battery. V_ACTTRQ represents output torque value of the motor 2, which is the same as the V_MOTTRQ. I_MOT represents information such as the amount of generated energy of the motor 2 showing electric loading. The motor 2 generates all the electric power consumed for the vehicle including the electric power for driving the motor.

A signal transmitted from the FI/MG ECU 4 to the MOT ECU 5 will be described. V_CMDPWR represents output required value to the motor 2. V_ENGTRQ represents output torque value of the engine 1. I_MG represents information such as the actuation mode, assist mode and the regeneration mode with respect to the motor 2.

A signal transmitted from the master power MP to the FI/MG ECU 4 will be described. V_M/PNP represents negative pressure detected value at a constant pressure chamber of the master power MP.

A signal transmitted from the positioning switch PSW to the FI/MG ECU 4 will be described. N or P is transmitted as positioning information when the positioning switch PSW selects either the N range or the P range.

A signal transmitted from the CVT ECU 6 to the CVT 3 will be described. V_DRHP represents hydraulic pressure command value to the linear solenoid valve, which controls the hydraulic pressure within the cylinder of the drive pulley at the CVT 3. V_DNHP represents hydraulic pressure command value to the linear solenoid valve, which controls the hydraulic pressure within the cylinder of the driven pulley at the CVt 3. The transmission gear ratio of the CVT 3 is changed by the V_DRHP and the V_DNHP. V_SCHP represents hydraulic pressure command value to the linear solenoid valve, which controls the hydraulic pressure of the clutch at the CVT 3. The engaging force of the clutch is changed by the V_SCHP.

A signal transmitted from the CVT ECU 6 to the brake fluid pressure retaining unit RU will be described. F_SOLA is a flag for the On/Off operation of the solenoid valve SVA (FIG. 1) in the brake fluid pressure retaining unit RU, in which 1 is for turning on, while 0 is for turning off. F_SOLB is a flag for the On/Off operation of the solenoid valve SVB (FIG. 1) in the brake fluid pressure retaining unit RU, in which 1 is for turning on and 0 is for turning off.

A signal transmitted from the positioning switch PSW to the CVT ECU 6 will be described. The positioning switch PSW selects the N range, P range, R range, D range or the L range, and the selected range is transmitted as positioning information.

A signal transmitted from the mode switch MSW to the CVT ECU 6 will be described. The mode switch MSW selects either the D mode (normal running mode) or the S mode (sports running mode), and the selected mode is transmitted as mode information. The mode switch MSW is a mode selection switch, which works when the positioning switch PSW is set in the D range.

A signal transmitted from the brake switch BSW to the FI/MG ECU 4 and the CVT ECU 6 will be described. F_BKSW is a flag showing the condition whether the brake pedal BP is depressed (On) or released (Off). If the brake pedal BP is depressed, the numeral 1 is given, and if the brake pedal is released, the numeral 0 is given. As mentioned above, the signal may be a flag showing the condition whether the driver's foot is put on the brake pedal BP (On) or not (Off).

<Conditions for Retaining Brake Fluid Pressure>

In the vehicle having the above system configuration, conditions that brake fluid pressure is retained by the brake fluid pressure retaining unit RU will be described. As shown in FIG. 7, such conditions includes (I) the driving force of the vehicle is in weak creep and (II) the vehicle speed becomes 0 km/h. When these conditions are satisfied, the two solenoid valves SV, SV (solenoid valves A, B) are both closed, thereby retaining the brake fluid pressure within the wheel cylinder WC. The driving force turns to the weak creep (F#WCRON=1) after a weak creep order (F#WCRP=1) is transmitted.

(I) "Weak creep" is required for the reason that the driver has to forcefully depress the brake pedal BP on a slope. The driver can stop the vehicle on the slope without forcefully depressing the brake pedal BP since in strong creep sufficient driving force can be obtained so as to keep the vehicle stationary on the slope at an inclination angle of 5 degrees. Therefore, the driver may have been slightly depressing the brake pedal BP. In this circumstance, if the solenoid valve SV is closed and the engine is turned off, the vehicle will unintentionally displace backward.

(II) "the vehicle speed of 0 km/h", is required since the driver can not select a position for stopping the vehicle if the solenoid valve SV is closed during the vehicle is running.

I. Conditions Required for Weak Creep Order

Figure 7A:
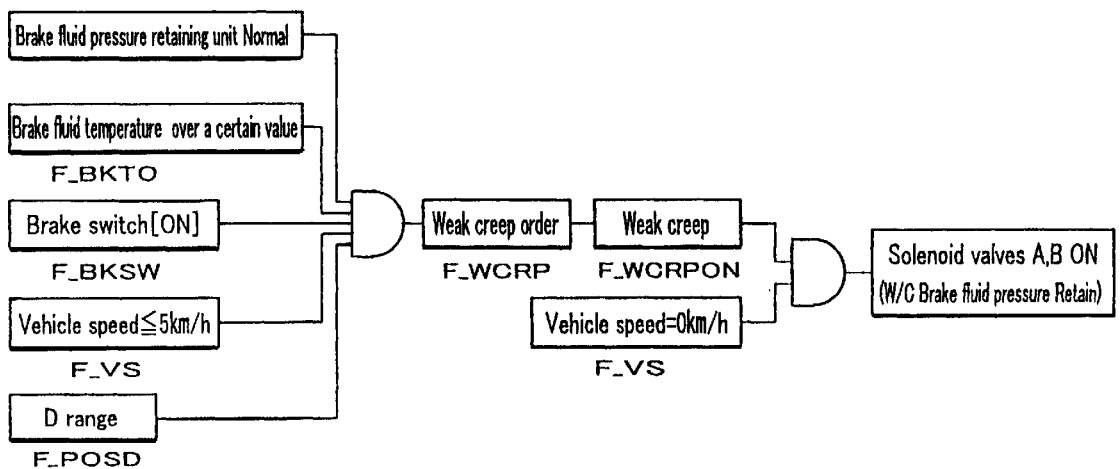
FIG. 7A shows the logic for closing a solenoid valve.

As shown in FIG. 7A, a weak creep order is transmitted when all the following conditions are satisfied, i.e., (1) the brake fluid pressure retaining unit RU is normal, (2) temperature of the brake fluid is over a certain value (F_BKTO), (3) the brake pedal BP is depressed and the brake switch BSW is On (F_BKSW), (4) vehicle speed is less than 5 km/h (F_VS), and (5) the positioning switch PSW is in the D range (F_POSD). As mentioned before, the reason that the driving force is kept in weak creep is for reminding the driver of depressing the brake pedal BP forcefully. However, this is also for improving fuel consumption.

(1) The weak creep order is not transmitted when the brake fluid pressure retaining unit RU is not normal. If the weak creep order is transmitted irrespective of abnormal conditions, for example the solenoid valve SV does not close, and the vehicle is in weak creep, the vehicle will unintentionally displace backward on a slope after the driver releases the brake pedal BP. This is because the brake fluid pressure is not retained within the wheel cylinder WC and the braking force is suddenly lost after releasing the brake pedal BP. Therefore, a smooth starting operation on the slope without unintentional backward displacement of the vehicle is achieved by the strong creep condition of the vehicle.

(2) The weak creep order is not transmitted when the temperature of the brake fluid is less than a certain value. If the brake fluid pressure retaining unit RU actuates irrespective of low brake fluid temperatures, and the solenoid valve SV is closed, reduction speed of the brake fluid pressure within the wheel cylinder WC will be too slow after partly releasing the brake pedal BP. When the brake pedal BP is loosened, the brake switch BSW is still On and the solenoid valve SV is continuously kept closed. Therefore, the brake fluid is merely discharged through the narrow restriction D. Further, if the temperature of the brake fluid is low, the viscosity thereof is high and the brake fluid doses not flow at a certain speed. For this reason, the braking force is kept strong continuously.

As mentioned above, when the brake fluid is at low temperatures, the vehicle is kept in the strong creep condition and is prohibited to be in the weak creep condition so as to prevent the vehicle from unintentional backward displacement. If the strong creep condition is maintained, the brake fluid pressure retaining unit RU does not actuate and the solenoid valve SV is not closed.

As to the brake fluid pressure retaining unit RU without the restriction D in the brake fluid pressure circuit BC, such as the brake fluid pressure retaining unit RU comprising a servo valve LSV for controlling degrees of valve opening, management of the brake fluid temperature is not so important. Also, in the case of the brake fluid pressure retaining unit RU having a mechanism for restricting the recovering speed of the brake pedal BP, management of the brake fluid temperature is not so important. Therefore, when the brake fluid temperature is not sufficiently high, the weak creep order can be transmitted.

(3) The weak creep order is not transmitted when the brake pedal BP is not depressed (F#BKSW). This is because the driver does not intend reduction of the driving force.

(4) The weak creep order is not transmitted when the vehicle speed is at 5 km/h or more. This is because driving force of the driving wheels 8,8 is transmitted to the engine 1 or the motor 2 through the clutch so as to obtain engine brake or carry out regenerative power generation by the motor.

(5) When the positioning switch PSW is in the R range or L range and is not in the D range, the weak creep order is not transmitted. This is for facilitating steering operation of the vehicle at a garage with the vehicle kept in the strong creep condition.

Judgment whether the vehicle is in the weak creep is carried out based on the hydraulic pressure command value with respect to the clutch of the CVT. The flag F_WCRPON showing the weak creep condition is maintained until the vehicle again becomes in the strong creep condition.

II. Conditions Required for Automatically Turning Off the Engine

Figure 7B:
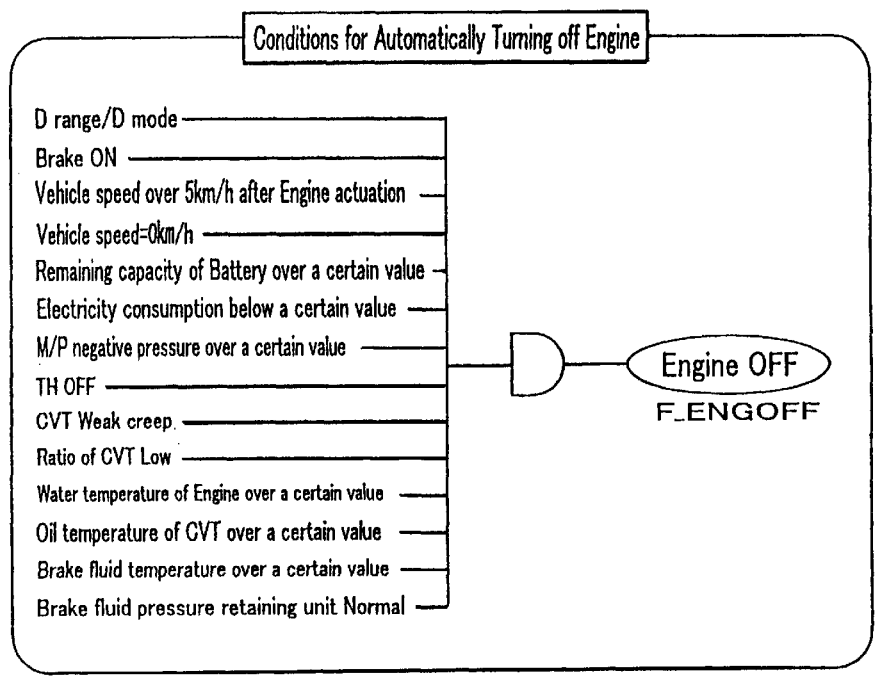
FIG. 7B shows the logic for automatically turning off the engine.

In order to improve fuel consumption, the driving motor automatic stopping apparatus automatically turns off the engine 1 while the vehicle stops. Conditions required for automatically turning off the engine will be described below. When all the following conditions are satisfied, the engine stop order (F_ENGOFF) is transmitted and the engine is automatically turned off (FIG. 7B).

(1) The positioning switch PSW selects the D range and the mode switch MSW selects the D mode (hereinafter referred to as "D range/D mode"). Except for the D range/D mode, the engine is not stopped as long as the ignition switch is turned off. This is because if the engine is stopped notwithstanding that the positioning switch PSW is in the P range or the N range, the driver may consider that the ignition switch is off and he may leave the vehicle.

When the positioning switch PSW selects the D range and the mode switch MSW selects the S mode (hereinafter referred to as "D range/S mode"), automatic turning off operation of the engine is not carried out. This is because the driver is expecting quick start operation of the vehicle in the D range/S mode. The engine is not automatically stopped when the positioning switch PSW is in the L range or the R range. This is because the steering operation at the garage will be time-consuming if the engine stops frequently.

(2) The brake pedal BP is depressed and the brake switch BSW is On. This is for warning the driver. The driver puts his foot on the brake pedal BP when the brake switch BSW is On. Therefore, if the engine is stopped and the driving force is lost, the driver can easily increase a brake pedal load before the vehicle unintentionally displaces backward on a slope.

(3) After the engine is actuated, the vehicle speed is once reaches to 5 km/h. This is for facilitating the steering operation at the garage while the vehicle moves in the creep running. The steering operation at the garage will be time-consuming if the engine is turned off whenever the vehicle stops for changing steering directions.

(4) Vehicle speed is 0 km/h. Driving force is not required when the vehicle stops.

(5) Capacity of the battery is more than a certain value. If the remaining capacity of the battery is not enough to restart the engine, the motor cannot actuate the engine after turning off the engine.

(6) Electricity consumption is below a certain value. This is for securing sufficient electrical supply to loads. The engine can be stopped if the electricity consumption is below a certain value.

(7) Load of the constant pressure chamber of the master power MP is over a certain value. Since negative pressure in the constant pressure chamber is obtained from the intake pipe of the engine, negative pressure in the constant pressure chamber becomes far smaller if the engine is stopped at smaller negative pressures. This leads to reduced amplification of the brake load when the driver depresses the brake pedal BP, and hence resulting in deteriorated braking performance.

(8) The accelerator pedal is not depressed. Since the driver does not intend further increase of the driving force, the engine may be stopped.

(9) The CVT is in weak creep. This is for reminding the driver of depressing the brake pedal BP forcefully so as to prevent the vehicle from unintentionally displacing backward upon turning off the engine. While the engine actuates, backward displacement of the vehicle is prevented by the total amount of the braking force and the creep driving force. In the strong creep, the driver may insufficiently depress the brake pedal BP. Therefore, the vehicle is kept in weak creep condition before the engine is turned off.

(10) Ratio of the CVT is low. Unless the ratio of the CVT (pulley ratio) is low, the engine is not automatically turned off. In order to achieve a smooth starting operation, the engine is turned off when the ratio of the CVT is low.

(11) Water temperature of the engine is over a certain value. This is because turning on and turning off operation should be carried out when the engine is in stable conditions. In cold area, if the water temperature is low, the engine may not restart. Therefore, automatic turning off operation of the engine is not carried out unless the water temperature is sufficiently high.

(12) Oil temperature of the CVT is over a certain value. If the oil temperature of the CVT is low, start-up for the hydraulic pressure of the clutch will cause a delay. Therefore, the required time from actuation of the engine 1 to the strong creep condition is extended, and the vehicle will displace backward on a slope. For this reason, the engine 1 is not turned off when the oil temperature of the CVT is low.

(13) Brake fluid temperature is over a certain value. This is because when the brake fluid temperature is low, flow resistance at the restriction D becomes larger and brake dragging will be caused. For this reason, the brake fluid pressure retaining unit is not actuated. Turning off the engine and turning to the weak creep condition are restricted such that the vehicle is kept in the strong creep condition and is prevented from unintentional backward displacement. As to the brake fluid pressure retaining unit RU without the restriction D in the brake fluid pressure circuit BC, such as the brake fluid pressure retaining unit RU comprising a servo valve LSV for controlling degrees of valve opening, management of the brake fluid temperature is not so important. Also, in the case of the brake fluid pressure retaining unit RU having a mechanism for restricting the recovering speed of the brake pedal BP, management of the brake fluid temperature is not so important. Therefore, when the brake fluid temperature is not sufficiently high, the weak creep order can be transmitted.

(14) The brake fluid pressure retaining unit RU is normal. Since brake fluid pressure may not be retained if the brake fluid pressure retaining unit RU is out of order, the strong creep condition is kept for preventing the vehicle from unintentional backward displacement on a slope. The automatic engine stop operation is not carried out if the brake fluid pressure retaining unit RU is out of order. Meanwhile, if the brake fluid pressure retaining unit RU is normal, the engine is automatically turned off.

<Conditions for Releasing Brake Fluid Pressure>

Figure 8A:
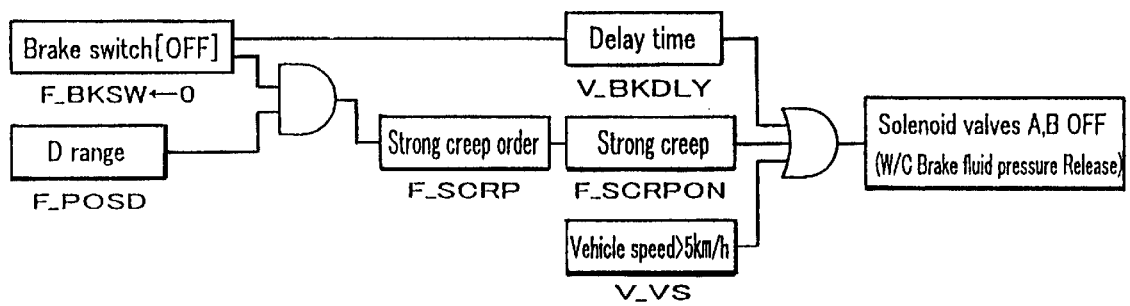
FIG. 8A shows the logic for opening a solenoid valve.

As shown in FIG. 8A, the solenoid valve SV once closed is open for releasing the brake fluid pressure on condition that any of the following condition is satisfied: (I) a certain delay time has been passed after releasing the brake pedal BP, (II) driving force is in strong creep, and (III) the vehicle speed is over 5 km/h.

(I) Count of the delay time starts after the brake pedal BP is released (when the brake switch BSW is Off). The delay time is about 2 to 3 seconds. As a fail-safe action, the solenoid valve SV is open after a certain delay time, thereby preventing brake dragging.

(II) The solenoid valve SV is open when the driving force is in strong creep. Since the driving force in the strong creep condition enables the vehicle to park against a slope having an inclination angle of 5 degrees, there is no need to retain the brake fluid pressure within the wheel cylinder WC so as to prevent the vehicle from backward displacement. It is after transmission of the strong creep order (F_SCRP) that the driving force becomes in strong creep. The strong creep order is transmitted when the positioning switch selects the D range and after the brake pedal BP is released.

Conditions for Automatically Turning off the Engine

Figure 8B:
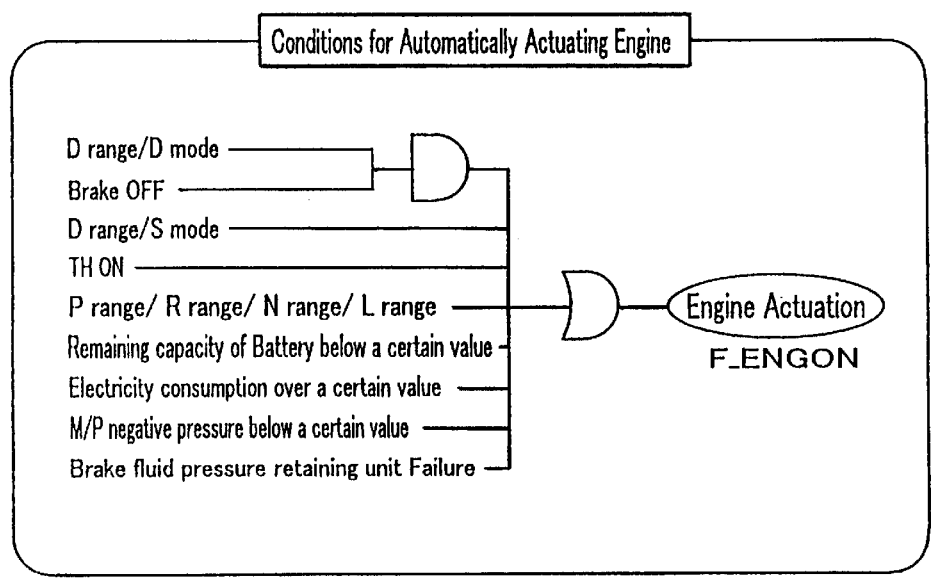
FIG. 8B shows the logic for automatically turning on the engine.

After automatically turning off the engine, the engine is automatically restarted in the following conditions. These conditions will be described with reference to FIG. 8B. The engine is automatically actuated if any of the following conditions is satisfied.

(1) D range/D mode is kept and the brake pedal BP is released. Since this is considered that the driver initiated the starting operation, the engine is automatically actuated.

(2) D range/S mode is selected. When the D range/S mode is selected while the engine has been automatically turned off in the D range/D mode, the engine is automatically actuated. Since the driver is expecting a quick start of the vehicle in the D range/S mode, the engine is automatically actuated irrespective of the brake pedal release.

(3) Accelerator pedal is depressed. This is because the driver is expecting the driving force by the engine.

(4) P range, N range, L range or R range is selected. When the P range is selected while the engine has been automatically turned off in the D range/D mode, the engine is automatically actuated. If the engine is not automatically actuated upon switching to the P range or the N range, the driver may think that the ignition switch was already turned off or that he does not have to turn off the ignition switch, and he may leave the vehicle. In order to prevent such a mistake and ensure fail-safe performance, the engine is restarted when any of these ranges is selected. Meanwhile, the engine is also automatically actuated when the L range or the R range is selected since such a switching operation is considered that the driver intends to start the vehicle.

(5) Remaining capacity of the battery is below a certain value. The engine is not turned off unless the remaining capacity of the battery is over a certain value. However, capacity of the battery may lower after the engine is automatically turned off. In this case, the engine is automatically actuated for the purpose of the battery charge. The certain value is set to be higher than the critical battery capacity, below which the engine is not actuated.

(6) Electricity consumption reaches to a certain value. While electricity consumers such as lights are working on, capacity of the battery decreases quickly. As a result, the engine will not be restarted. For this reason, irrespective of the remaining capacity of the battery, the engine is automatically actuated when the electricity consumption is over a certain value.

(7) Negative pressure of the master power MP is below a certain value. The lower the negative pressure at the master power MP, the less braking force is obtained. Therefore, the engine is restarted for securing sufficient braking force.

(8) The brake fluid pressure retaining unit is out of order. When the solenoid valve SV or the driving circuit of the solenoid valve is out of order, the engine is actuated and the driving force is kept in strong creep. If the engine is turned off and failure is detected in the brake fluid pressure retaining unit RU comprising the solenoid valve, the engine is immediately actuated such that the driving force is kept in strong creep. This is because brake fluid pressure may not be retained after releasing the brake pedal BP upon starting off the vehicle. In other words, the strong creep prevents the vehicle from unintentional backward displacement and facilitates a smooth starting operation of the vehicle.

<Time Chart for Control (1)>

With reference to FIG. 9, the way of control will be described for the vehicle having the above system configuration. The positioning switch PSW and the mode switch MSW of the vehicle are not changed from the D range/D mode, and the vehicle is on the run. The brake fluid pressure retaining unit RU comprises a relief valve RV.

Figure 10:
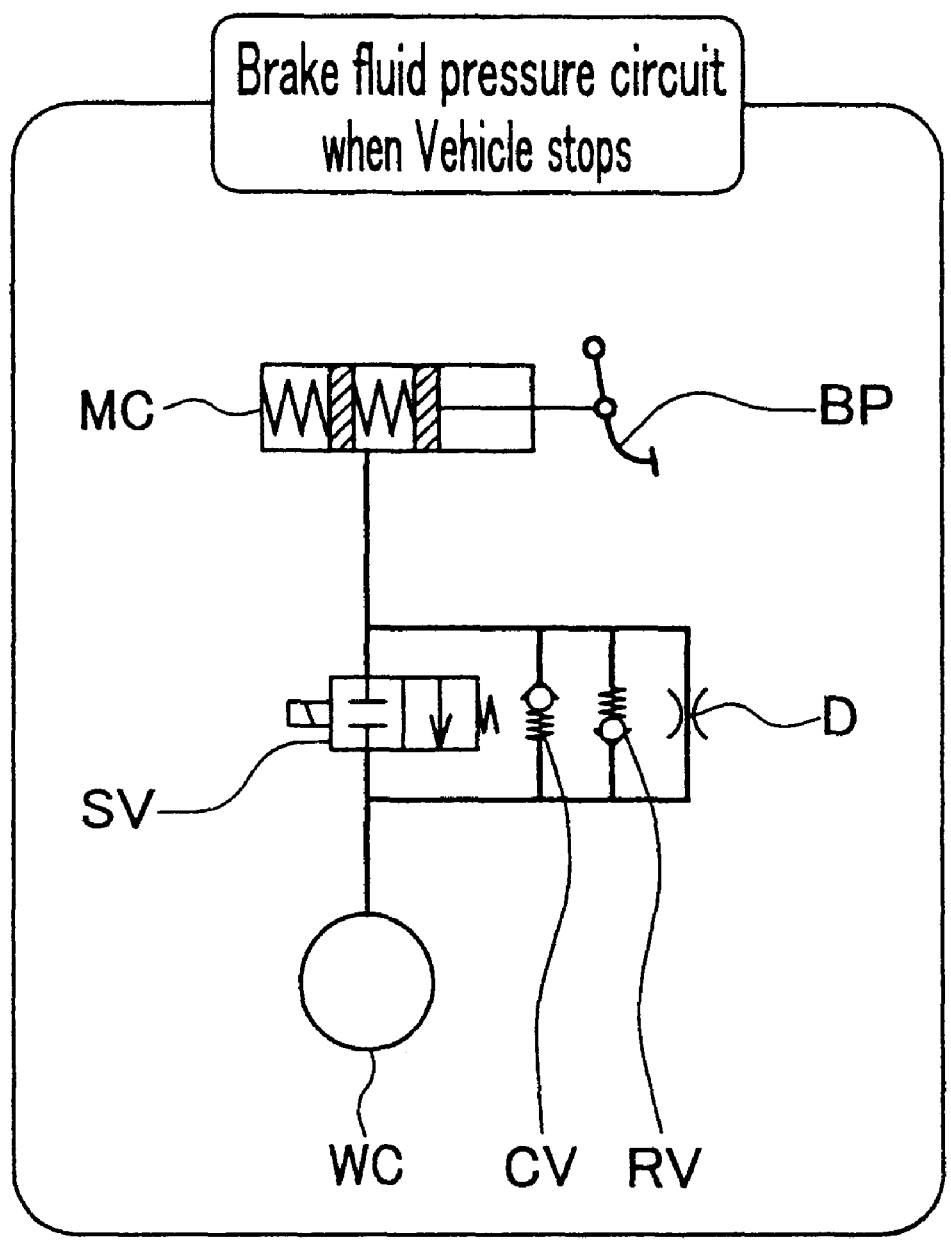
FIG. 10 shows a brake fluid pressure circuit of the vehicle shown in FIG. 9. The brake fluid pressure circuit corresponds to the condition when the vehicle stops.

In FIG. 9, the upper part of the time chart shows a relation in time sequence between driving force and braking force of the vehicle, in which a thick line indicates driving force and a thin line indicates braking force, and the lower part of the time chart shows opening or closing condition of the solenoid valve SV. FIG. 10 shows the brake fluid pressure circuit when the vehicle stops, in which the solenoid valve SV is closed.

As shown in FIG. 9, when the driver depresses the brake pedal BP while the vehicle is running (Brake switch [ON]), braking force is increasing. Since the driver releases the accelerator pedal when he depresses the brake pedal BP, the driving force is gradually decreasing until it is in strong creep (normal idling) in the end. When the driver continuously depresses the brake pedal BP and the vehicle speed decreases below 5 km/h, the weak creep order (F_WCRP) is transmitted. The driving force is reduced and is then turned to be in weak creep (F_WCRPON).

When the vehicle speed becomes 0 km/h, the solenoid valve SV is closed and the engine is automatically turned off (F_ENGOFF) so that the driving force is lost. Brake fluid pressure is retained within the wheel cylinder WC while the solenoid valve SV is closed. Meanwhile, since the engine is turned off after the driving force becomes in the weak creep condition, the driver depresses the brake pedal BP in order to prevent unintentional backward displacement of the vehicle. Therefore, even if the engine is automatically turned off, the vehicle does not displace backward (backward displacement restriction force). If the vehicle displaces backward, the driver additionally increases a brake pedal load by slightly depressing the brake pedal BP. Since the driver's foot is put on the brake pedal BP, the driver can easily depress the brake pedal additionally without any confusion. The automatic turning off operation of the engine results in improved fuel economy and decreased amount of exhaust gas.

Conditions that the driving force becomes in weak creep, that the solenoid valve is closed, and that the engine is automatically turned off are the same as those previously described with reference to FIG. 7.

The driver then releases the break pedal BP in order to stand by restart of the vehicle. As shown in FIG. 9, if the driver depresses the bake pedal BP more than the setting value of the relief valve RV (relief pressure), the relief valve RV works as soon as the driver releases the brake pedal BP such that the braking force decreases in a short time to the relief pressure. Provision of the relief valve RV ensures a smooth start operation of the vehicle on the slope even if the driver has been forcefully depressing the brake pedal BP.

When the brake pedal BP is fully released (Brake switch [OFF]), the automatic engine actuation order (F_ENGON) is transmitted. After a time lag derived from a delay of signal communication and mechanisms, the engine is automatically actuated and the driving force increases until it becomes in strong creep (F_SCRPON). The time interval required for the strong creep after releasing the brake pedal (the brake switch BSW is Off) is about 0.5 seconds. Since the solenoid valve SV remains closed during the interval, the brake fluid within the wheel cylinder WC flows into the master cylinder MC merely through the restriction D. Therefore, the braking force gradually reduces so as to prevent the backward displacement of the vehicle.

When the driving force becomes in the strong creep condition (F_SCRPON), the closed solenoid valve SV is open and the brake fluid pressure within the wheel cylinder WC is reduced at a time. This is because the braking force prevents a smooth starting operation of the vehicle and brake dragging is caused in the end. The vehicle accelerates further by additionally depressing the accelerator pedal.

Conditions that the driving force becomes in strong creep and that the solenoid valve SV is open are the same as those previously described with reference to FIG. 8.

As shown in FIG. 9, a phantom line is extending downwardly from "Relief pressure" on the line indicating braking force. The phantom line indicates a case when the brake fluid pressure is not retained. In this case, since reduction of the braking force takes place immediately after decreasing the brake pedal load and the braking force is quickly lost, a smooth starting operation of the vehicle is not achieved. Meanwhile, on the line indicating braking force, a phantom line is extending downwardly from the point where the solenoid valve is open. This phantom line indicates reduction of the braking force when the solenoid valve SV is not open. If the braking force decreases along this phantom line, brake dragging would be caused. V_BKDLY in the lower part of FIG. 9 indicates delay time. In view of fail-safe performance, the solenoid valve SV is open under any circumstances after a certain period of delay time has passed.

<Time Chart for Control (2)>

Figure 11:
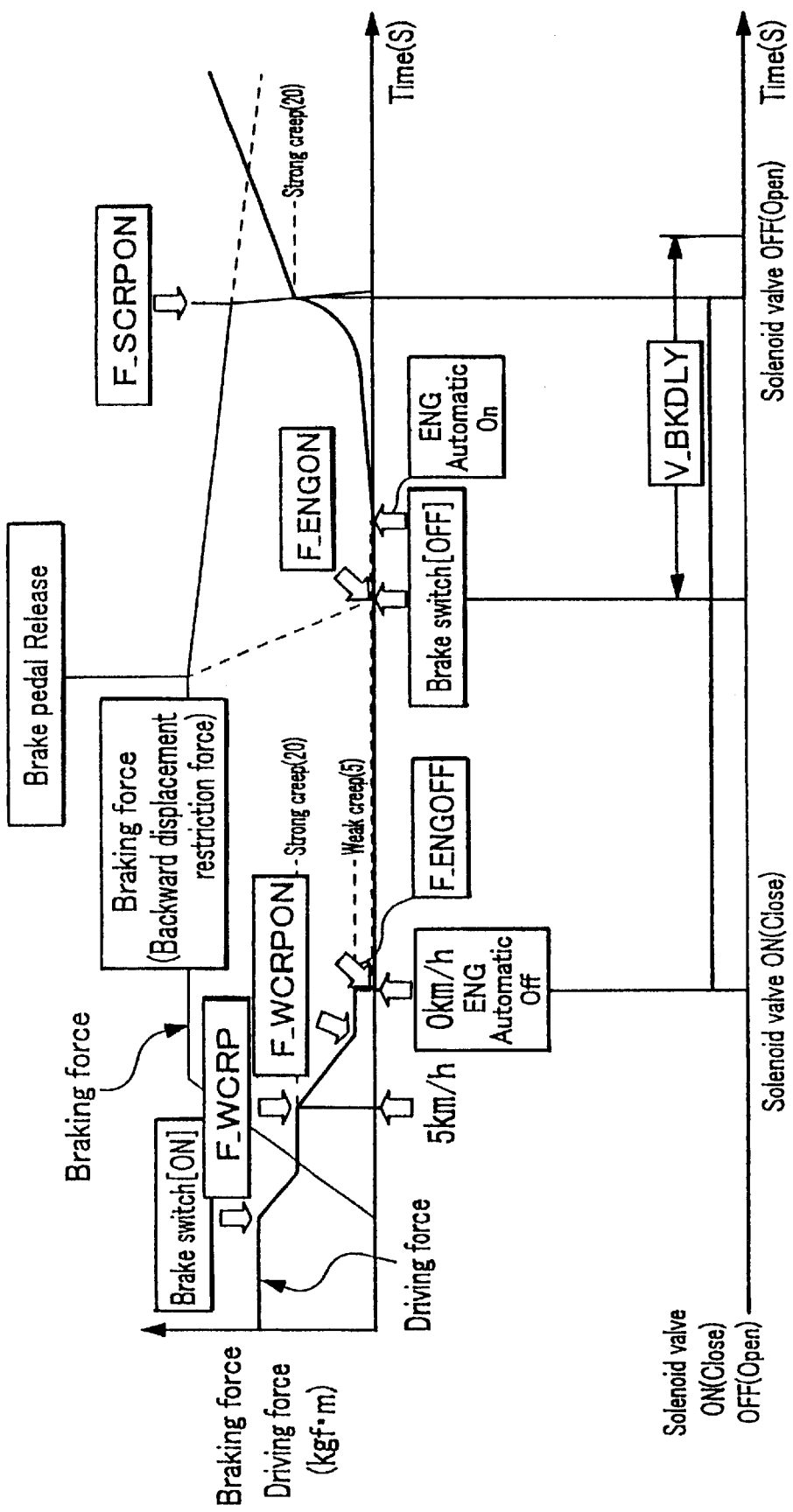
FIG. 11 is a time chart for the control of a vehicle without a relief valve, which corresponds to FIG. 9.

With reference to FIG. 11, the way of control will be described while the vehicle is on the run. The positioning switch PSW and the mode switch MSW of the vehicle are not changed from the D range/D mode. Not like the vehicle shown in <Time Chart for Control (1)>, the brake fluid pressure retaining unit RU does not comprise a relief valve RV.

Figure 12:
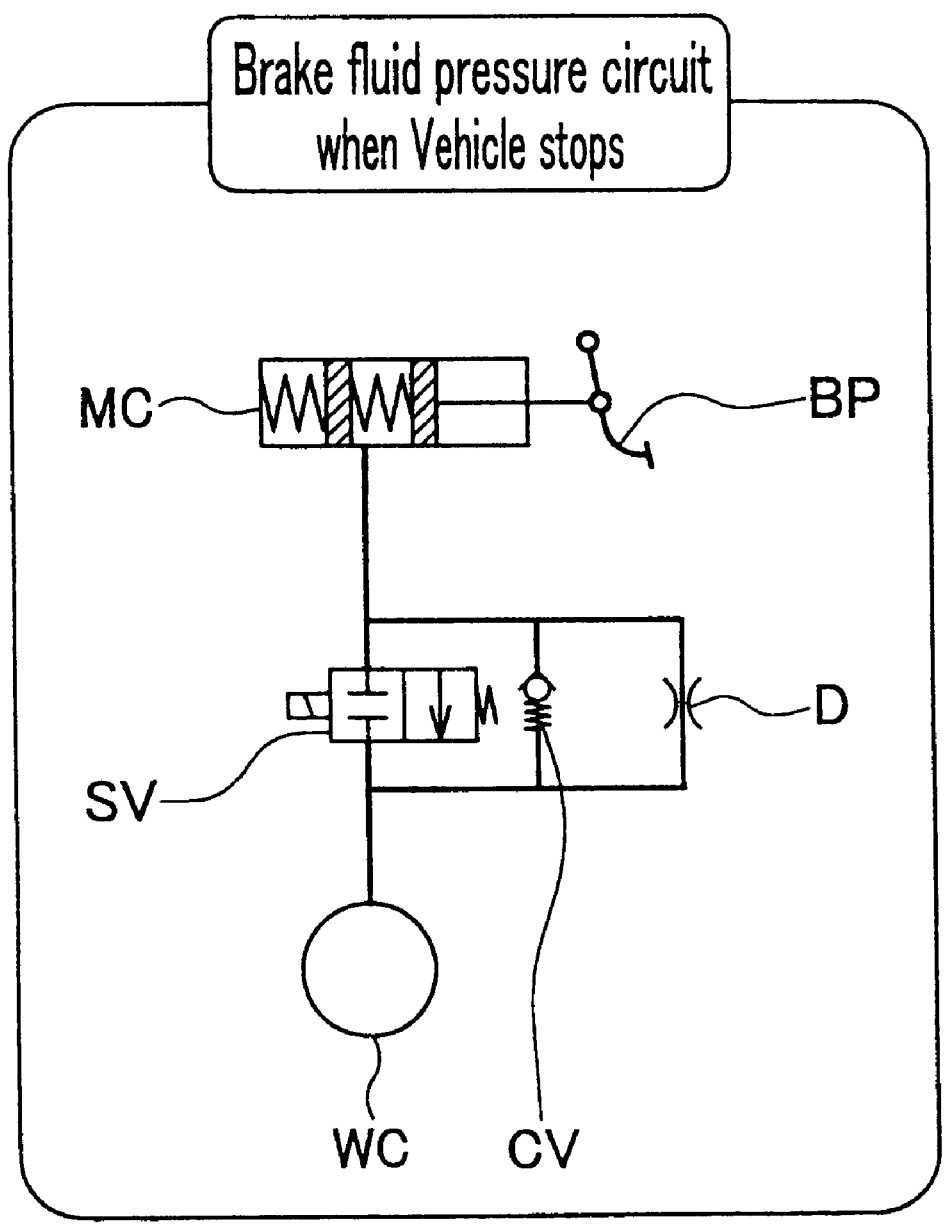
FIG. 12 shows a brake fluid pressure circuit of the vehicle shown in FIG. 11. The brake fluid pressure circuit corresponds to the condition when the vehicle stops.

As shown in FIG. 11, the upper part of the time chart shows a relation in time sequence between driving force and braking force of the vehicle, in which a thick line indicates driving force and a thin line indicates braking force, and the lower part of the time chart shows opening or closing condition of the solenoid valve SV. FIG. 12 shows the brake fluid pressure circuit when the vehicle stops, in which the solenoid valve SV is closed.

The processes before releasing the brake pedal BP are the same as those described in <Time Chart for Control (1)>. Just before the brake pedal BP is released (Brake switch [OFF]), the solenoid valve SV is closed and the engine is off. If the driver releases the brake pedal BP, the braking force gradually decreases since the relief valve is not provided with the brake fluid pressure retaining unit RU.

Meanwhile, when the brake pedal BP is released and the brake switch BSW is Off, the automatic engine actuation order (F_ENGON) is transmitted. After a time lag derived from a delay of signal communication and mechanisms, the engine is automatically actuated. Since such an operation is described in <Time Chart for Control (1)>, further explanation is omitted.

In this example, the braking force in the strong creep condition becomes greater, compared to the vehicle shown in <Time Chart for Control (1)>. This is because the brake fluid pressure retaining unit RU does not include a relief valve. However, since the solenoid valve SV is open in the strong creep condition, the braking force is immediately lost, thereby preventing brake dragging. The time interval required for the strong creep after releasing the brake pedal (the brake switch BSW is Off) is about 0.5 seconds. The vehicle accelerates further by additionally depressing the accelerator pedal.

As shown in FIG. 11, a phantom line is extending downwardly from the point "Brake pedal Released" on the line indicating braking force. The phantom line indicates a case when the brake fluid pressure is not retained. In this case, since the braking force is lost immediately, a smooth starting operation of the vehicle is not achieved. Meanwhile, on the line indicating braking force, a phantom line is extending downwardly from the point where the solenoid valve is open. This phantom line indicates reduction of the braking force when the solenoid valve SV is not open. If the braking force decreases along this phantom line, brake dragging would be caused. V_BKDLY in the lower part of the figure indicates delay time. In view of fail-safe performance, the solenoid valve SV is open under any circumstances after a certain period of delay time has passed. This is the same as described in <Time Chart for Control (1)>.

Accordingly, even if the brake fluid pressure retaining unit RU does not includes a relief valve, a smooth starting operation of the vehicle on the slope can be achieved.

<Time Chart for Control (3)>

Finally, with reference to FIG. 13, the way of control will be described while the vehicle is on the run. The positioning switch PSW and the mode switch MSW are not changed from the D range/D mode. The brake fluid pressure retaining unit RU comprises a relief valve RV. Not like the vehicles shown in <Time Chart for Control (1)>and <Time Chart for Control (2)>, the vehicle is not controlled such that the engine is automatically turned off when the vehicle stops.

As shown in FIG. 13, the upper part of the time chart shows a relation in time sequence between driving force and braking force of the vehicle, in which a thick line indicates driving force and a thin line indicates braking force, and the lower part of the time chart shows opening or closing condition of the solenoid valve SV.

Since the processes before the vehicle stops are the same as those described in <Time Chart for Control (1)>and the like, further explanation is omitted. The solenoid valve SV is closed when the vehicle stops. While, the engaging force of the clutch is kept in weak creep after the vehicle stops. Only a little driving force may be obtained in the weak creep condition, however consumption of fuel is saved in stead. It is the braking force that prevents the vehicle from backward displacement on the slope.

Conditions that the driving force becomes in weak creep and that the solenoid valve SV is closed are the same as those previously described with reference to FIG. 7.

The driver then releases the break pedal BP in order to stand by restart of the vehicle. As shown in FIG. 13, if the driver depresses the bake pedal BP more than the relief pressure of the relief valve RV, the relief valve RV works as soon as the driver releases the brake pedal BP such that the braking force decreases in a short time to the relief pressure. Provision of the relief valve RV ensures a smooth start operation of the vehicle on the slope even if the driver has been forcefully depressing the brake pedal BP.

When the brake pedal BP is fully released (Brake switch [Off]), the strong creep order (F_SCRP) is transmitted. The driving force increases until it becomes in the strong creep condition(F_SCRPON). Since the solenoid valve SV is closed after the brake pedal BP is released and before the driving force becomes in strong creep, the brake fluid within the wheel cylinder WC flows into the master cylinder MC merely through the restriction D. Therefore, as disclosed in <Time Chart for Control (1)>, the braking force gradually reduces so as to prevent the backward displacement of the vehicle.

When the driving force becomes in the strong creep condition (F_SCRPON), the closed solenoid valve SV is open and the brake fluid pressure within the wheel cylinder WC is reduced at a time. This is because the braking force prevents a smooth starting operation of the vehicle and brake dragging is caused in the end. The vehicle accelerates further by additionally depressing the accelerator pedal.

Conditions that the driving force becomes in strong creep and that the solenoid valve SV is open are the same as those previously described with reference to FIG. 8.

Referring to FIG. 13, a phantom line which is extending downwardly from "Relief pressure" on the line indicating braking force, and a phantom line which is extending downwardly from the point where the solenoid valve is open are the same as those described in <Time Chart for Control (1)>.

While the present invention has been described by way of specific examples, it is to be understood that changes and variations may be made without departing from the spirit or scope of the following claims.

What is claimed is:

1. A brake fluid pressure retaining unit, which is provided in a brake fluid pressure circuit arranged between a master cylinder at which brake fluid pressure is generated in accordance with a brake pedal load applied by the driver and a wheel cylinder at which the brake fluid pressure is converted into braking force, and which continuously retains brake fluid pressure within the wheel cylinder after releasing a brake pedal, the brake fluid pressure circuit comprising:

a solenoid valve for shutting off the brake fluid pressure circuit;

a restriction allowing a flow of brake fluid from said wheel cylinder to said master cylinder to gradually decrease the braking force even if the brake fluid pressure circuit is shut off;

a check valve for transmitting the brake fluid pressure generated at the master cylinder to the wheel cylinder when the driver further depresses the brake pedal while the brake fluid pressure circuit is shut off; and a relief valve for decreasing the brake fluid pressure to a certain pressure and retaining the same if the driver releases the depression of the brake pedal, wherein the relief valve is activated when the brake fluid pressure circuit is shut off and the driver generates brake fluid pressure greater than the certain pressure;

wherein at least one of said check valve and relief valve is constituted as a seat valve having a valve seat and a valve element and said restriction is formed between the valve seat and the valve element.

2. A brake fluid pressure retaining unit according to claim 1, wherein said restriction is formed by a groove provided between said valve seat and said valve element.

3. A brake fluid pressure retaining unit, which is provided in a brake fluid pressure circuit arranged between a master cylinder at which brake fluid pressure is generated in accordance with a brake pedal load applied by the driver and a wheel cylinder at which the brake fluid pressure is converted into braking force, and which continuously retains brake fluid pressure within the wheel cylinder after releasing a brake pedal, the brake fluid pressure circuit comprising:

a solenoid valve for shutting off the brake fluid pressure circuit;

a restriction allowing a flow of brake fluid from said wheel cylinder to said master cylinder to gradually decrease the braking force even if the brake fluid pressure circuit is shut off;

a check valve for transmitting the brake fluid pressure generated at the master cylinder to the wheel cylinder when the driver further depresses the brake pedal while the brake fluid pressure circuit is shut off; and a relief valve for decreasing the brake fluid pressure to a certain pressure if the driver releases the depression of the brake pedal, wherein the relief valve is activated when the brake fluid pressure circuit is shut off and the driver generates brake fluid pressure greater than the certain pressure, wherein at least one of said check valve and relief valve is constituted as a seat valve having a valve seat and a valve element and said restriction is formed between the valve seat and the valve element, wherein said solenoid valve, said check valve and said relief valve are all connected in parallel in the brake fluid pressure circuit.

* * * * *